US012705493B2

(12) United States Patent
Wilson et al.

(10) Patent No.: US 12,705,493 B2
(45) Date of Patent: Aug. 11, 2026

(54) TESTING PREDICTED DATA UTILIZING TRAINED MACHINE LEARNING MODEL

(71) Applicant: Truist Bank, Charlotte, NC (US)

(72) Inventors: Dontá Lamar Wilson, Charlotte, NC (US); Jane Moury Kane, Winston-Salem, NC (US); Kenneth William Cluff, Powhatan, VA (US); Peter Councill, Richmond, VA (US); Qing Li, Cary, NC (US); James Xu, Raleigh, NC (US)

(73) Assignee: TRUIST BANK, Charlotte, NC (US)

( * ) Notice: Subject to any disclaimer, the term of this patent is extended or adjusted under 35 U.S.C. 154(b) by 819 days.

(21) Appl. No.: 17/815,251

(22) Filed: Jul. 27, 2022

(65) Prior Publication Data

US 2024/0037406 A1 Feb. 1, 2024

(51) Int. Cl.
*G06N 3/08* (2023.01)
*G06N 3/088* (2023.01)
*G06Q 40/02* (2023.01)

(52) U.S. Cl.
CPC ............. *G06N 3/088* (2013.01); *G06Q 40/02* (2013.01)

(58) Field of Classification Search
CPC ............................... G06N 3/088; G06Q 40/02
See application file for complete search history.

(56) References Cited

U.S. PATENT DOCUMENTS 9,870,465 B1 * 1/2018 Levi ...................... G06F 21/577
10,339,468 B1 7/2019 Polychronopoulos
10,565,471 B1 * 2/2020 Abdi Taghi Abad .... G06N 7/01
11,004,004 B1 5/2021 Goldstein
11,023,967 B1 6/2021 Schlesinger
11,042,930 B1 * 6/2021 Mintz ...................... G06N 7/01
11,127,099 B2 9/2021 Eidelman
(Continued)

FOREIGN PATENT DOCUMENTS

CN 110796262 A 2/2020

OTHER PUBLICATIONS

I. Ismath and A. Kirupananda, "TrustCredit—An Individual Credit Scoring Mechanism Using Alternative Mobile Interaction Touchpoints," 2021 IEEE Region 10 Symposium (TENSYMP), Jeju, Korea, Republic of, 2021, pp. 1-7 (Year: 2021).

*Primary Examiner* — Nhat Huy T Nguyen
(74) *Attorney, Agent, or Firm* — Michael A. Springs, Esq.; Shumaker, Loop & Kendrick, LLP; Patrick B. Horne

(57) ABSTRACT

A computing system is configured to generate a predictive model during training of a machine learning program using a training data set including a personal data set of a plurality of first users. The predictive model is configured to predict a predicted assessment score of a second user. A test personal data set is generated with at least one different data entry different from the personal data set utilized in predicting the predicted assessment score, the at least one different data entry corresponding to a change in relationship between the computing system and the second user. The predictive model predicts a test predicted assessment score of the second user based on the test personal data set. The computing system takes further action with respect to the second user when a difference between the predicted assessment score and the test predicted assessment score meets or exceeds a threshold value.

20 Claims, 9 Drawing Sheets

(56) References Cited

U.S. PATENT DOCUMENTS

| | | | | |
|---|---|---|---|---|
| 11,350,170 | B1 | 5/2022 | Arazi | |
| 11,429,957 | B1 | 8/2022 | Eidam | |
| 11,663,668 | B1 | 5/2023 | Bloom | |
| 11,783,951 | B2 | 10/2023 | Carlson | |
| 11,875,408 | B2 | 1/2024 | Gebara | |
| 11,900,400 | B2 | 2/2024 | Deshmukh | |
| 11,942,194 | B2 | 3/2024 | Shriberg | |
| 12,327,261 | B2 | 6/2025 | Kane | |
| 2011/0099122 | A1 | 4/2011 | Bright | |
| 2016/0034932 | A1* | 2/2016 | Sion | G06Q 30/0226 705/14.1 |
| 2017/0193604 | A1 | 7/2017 | Johansen | |
| 2019/0019246 | A1 | 1/2019 | Bowman | |
| 2019/0180358 | A1 | 6/2019 | Nandan | |
| 2019/0378207 | A1 | 12/2019 | Dibner-Dunlap | |
| 2020/0090063 | A1 | 3/2020 | Reynolds | |
| 2020/0104763 | A1 | 4/2020 | Carney | |
| 2020/0134637 | A1 | 4/2020 | Srinivasan | |
| 2020/0143946 | A1 | 5/2020 | Lewis | |
| 2020/0160180 | A1 | 5/2020 | Lehr | |
| 2020/0210913 | A1* | 7/2020 | Daggubati | G06F 16/258 |
| 2020/0285645 | A1 | 9/2020 | Sandstrom | |
| 2021/0326976 | A1 | 10/2021 | Natali, Jr. | |
| 2022/0019918 | A1 | 1/2022 | Subramanian | |
| 2022/0036361 | A1 | 2/2022 | Johnson | |
| 2022/0036369 | A1* | 2/2022 | Ranganathan | G06F 18/24 |
| 2022/0405837 | A1 | 12/2022 | Zaluski | |
| 2023/0179955 | A1 | 6/2023 | Williams | |
| 2023/0214916 | A1 | 7/2023 | Kim | |
| 2023/0237165 | A1 | 7/2023 | Prasad | |
| 2023/0252267 | A1 | 8/2023 | Saleh | |
| 2023/0351435 | A1 | 11/2023 | Wright | |
| 2024/0054205 | A1 | 2/2024 | Goodsitt | |
| 2025/0156890 | A1 | 5/2025 | Kane | |
| 2025/0165774 | A1 | 5/2025 | Hu | |

* cited by examiner

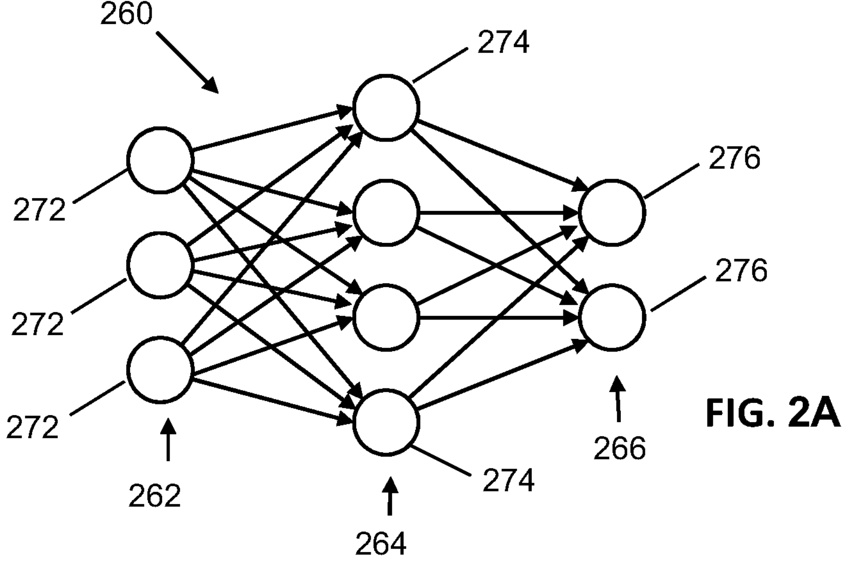
FIG. 2A
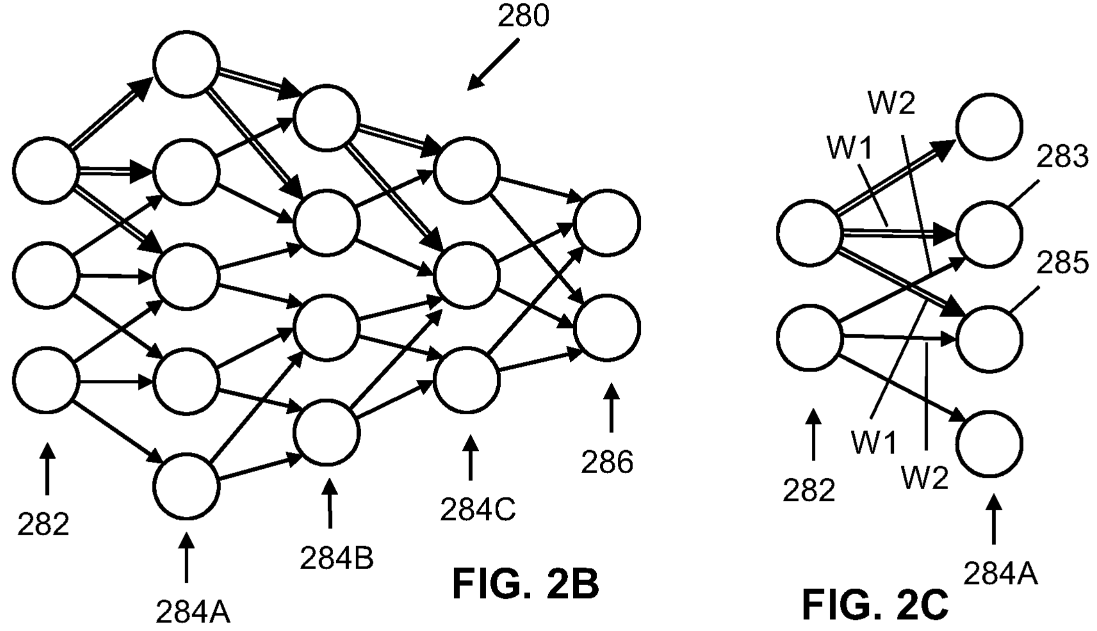
FIG. 2B
FIG. 2C

TESTING PREDICTED DATA UTILIZING TRAINED MACHINE LEARNING MODEL

FIELD OF THE INVENTION

This invention relates generally to the analysis of survey related data, and more particularly, embodiments of the invention relate to the use of machine learning processes for predicting survey related data with respect to an individual by use of the personal data accumulated with respect to the individual.

BACKGROUND OF THE INVENTION

It is known to conduct a financial health (wellness) assessment survey in order to make an assessment regarding the financial competency or well-being of a respondent thereto. Such an assessment may include the calculation of one or more assessment scores considered indicative of the financial well-being or competency of the respondent. Such assessment scores may include a holistic score wherein an overall competency of the respondent is evaluated or one or more sub-scores where a competency of the respondent is evaluated with respect to certain categories of the questions posed by the survey. For example, the survey may include questions regarding the habits of the respondent with respect to financial matters that are divided into categories related to specific topics, such as the saving, spending, borrowing, and planning habits of the respondent, each of which may be associated with an independent sub-score of the respondent. The assessment of the respondent via the calculation of such scores is intended to inform the respondent of his or her well-being with respect to the corresponding financial topics, with the intention of allowing for an intervention in order to improve the competency or confidence of the respondent with respect to any necessary topics or categories of financial behavior.

One inherent shortcoming of the use of such assessment surveys is related to the time and effort required for the completion thereof. Such surveys may also be considered intrusive with respect to requesting certain impressions of the respondent with respect to personal or private data. The completion of such surveys by the respondent is also often optional in most circumstances where such surveys are offered. Each of these factors may result in a low participation rate for the survey, which may bias the aggregate results thereof by introducing a sampling bias with regards to those respondents choosing to complete the survey.

Additionally, in the event that a respondent does complete the survey an initial instance, it may become even more difficult to acquire subsequent completions of the same survey from the same respondent based on the desire of the respondent to avoid further time or effort on a seemingly redundant task. Those respondents choosing to complete the survey an additional instance may also introduce further sampling bias into the aggregate survey data based on the reduced incidence of respondents completing such subsequent surveys. The decision for a respondent to complete the survey once again may also potentially bias the results of the subsequent survey, as the respondent may be referring back to a recollection of previous answers in determining how to respond to certain questions of the survey, or may be biased by the known assessment results of the previous iteration of the survey. Each of these factors may render it unreliable to rely upon the results of additional follow-up surveys in ascertaining any changes in the assessment results of the survey from one iteration to the next, or in turn ascertaining a change in the financial well-being or competency of the respondent over time on the basis of such information.

Another concern related to the reliance on such assessment surveys relates to the manner in which successive surveys cannot necessarily establish a causal relationship between the differences in responses or assessments from one iteration to the next, or changes regarding the aggregate data based on an analysis of the results of multiple subsequent assessment surveys. The completion of such surveys may not provide the data necessary for ascertaining such causal relationships, as the breadth and depth of data provided by the respondent during the completion of such surveys is typically not sufficient to confidently make associations regarding the relationship between the personal data of the respondent and the resulting assessments made by the survey methodology regarding the respondent. The above-mentioned introduction of sampling bias via the choices of respondents to participate and complete the survey may also render such comparisons as invalid or insufficient. Absent the ability to establish such a causal relationship, the use of such surveys may not be able to determine an appropriate intervention for improving the assessment of the financial well-being or health of the respondent. Additionally, any such intervention may not be made in a timely manner because the time passing between the completion of subsequent surveys or the failure of the respondent to complete one or more intermediate iterations of the survey may render such interventions as moot based on the changing circumstances of the respondent and the inability for the survey data to reflect such changes in real time.

It is therefore desirable to produce a system and method configured to provide an assessment of an individual absent the need for the individual to complete a corresponding survey. It is also desirable to produce a system and method configured to provide such assessments in response to changing circumstances of the individual, thereby increasing an ability for the system to properly intervene in improving the assessment of the individual in a timely manner.

SUMMARY OF THE INVENTION

Embodiments of the present invention address the above needs and/or achieve other advantages by providing apparatuses and methods that predict the survey responses of individuals based on the personal data available with respect to such individuals.

One embodiment of the invention includes the use of a computing system operatively connected with a user device. The computing system comprises a memory device and a processing device operatively coupled to the memory device. The processing device is configured to execute computer-readable program code to: generate a predictive model during training of a machine learning program including a neural network of the machine learning program performing cluster analysis via unsupervised learning, a training data set utilized during the training of the machine learning program comprising a personal data set of each of a plurality of first users, the personal data set of each of the plurality of the first users including a data entry regarding an assessment score determined with respect to each respective first user; predict, by the predictive model, a predicted assessment score of a second user associated with the user device, the predicting of the predicted assessment score including the predictive model correlating a personal data set of the second user to the personal data set of at least one of the first users; generate a test personal data set with respect to the second user, the test personal data set including a first data entry changed from the personal data set of the second user, the change of the first data entry corresponding to a change in a relationship between the second user and a first entity; predict, by the predictive model, a test predicted assessment score of the second user, the predicting of the test predicted assessment score including the predictive model correlating the test personal data set of the second user to the personal data set of at least one of the first users; and send a communication to the user device of the second user including content relating to the change in the relationship between the second user and the first entity when a difference between the predicted assessment score and the test predicted assessment score meets or exceeds a threshold value.

Another embodiment of the invention includes the use of a computing system operatively connected with a user device. The computing system comprises a memory device and a processing device operatively coupled to the memory device. The processing device is configured to execute computer-readable program code to: generate a predictive model during training of a machine learning program including a neural network of the machine learning program performing cluster analysis via unsupervised learning, a training data set utilized during the training of the machine learning program comprising a personal data set of each of a plurality of first users, the personal data set of each of the plurality of the first users including a data entry regarding an assessment score determined with respect to each respective first user; predict, by the predictive model, a predicted assessment score of a second user associated with the user device, the predicting of the predicted assessment score including the predictive model correlating a personal data set of the second user to the personal data set of at least one of the first users; generate a test personal data set with respect to the second user, the test personal data set including a first data entry changed from the personal data set of the second user, the change of the first data entry corresponding to a change in a relationship between the second user and a first entity; predict, by the predictive model, a test predicted assessment score of the second user, the predicting of the test predicted assessment score including the predictive model correlating the test personal data set of the second user to the personal data set of at least one of the first users; and change an account setting of the second user stored to the memory device when a difference between the predicted assessment score and the test predicted assessment score meets or exceeds a threshold value.

According to embodiments of the invention, a method of interacting with a user device comprising the steps of: generating a predictive model during training of a machine learning program including a neural network of the machine learning program performing cluster analysis via unsupervised learning, a training data set utilized during the training of the machine learning program comprising a personal data set of each of a plurality of first users, the personal data set of each of the plurality of the first users including a data entry regarding an assessment score determined with respect to each respective first user; predicting, by the predictive model, a predicted assessment score of a second user associated with the user device, the predicting of the predicted assessment score including the predictive model correlating a personal data set of the second user to the personal data set of at least one of the first users; generating a test personal data set with respect to the second user, the test personal data set including a first data entry changed from the personal data set of the second user, the change of the first data entry corresponding to a change in a relationship between the second user and a first entity; predicting, by the predictive model, a test predicted assessment score of the second user, the predicting of the test predicted assessment score including the predictive model correlating the test personal data set of the second user to the personal data set of at least one of the first users; and sending a communication to the user device of the second user including content relating to the change in the relationship between the second user and the first entity when a difference between the predicted assessment score and the test predicted assessment score meets or exceeds a threshold value.

The features, functions, and advantages that have been discussed may be achieved independently in various embodiments of the present invention or may be combined in yet other embodiments, further details of which can be seen with reference to the following description and drawings.

BRIEF DESCRIPTION OF THE DRAWINGS

Figure 1:
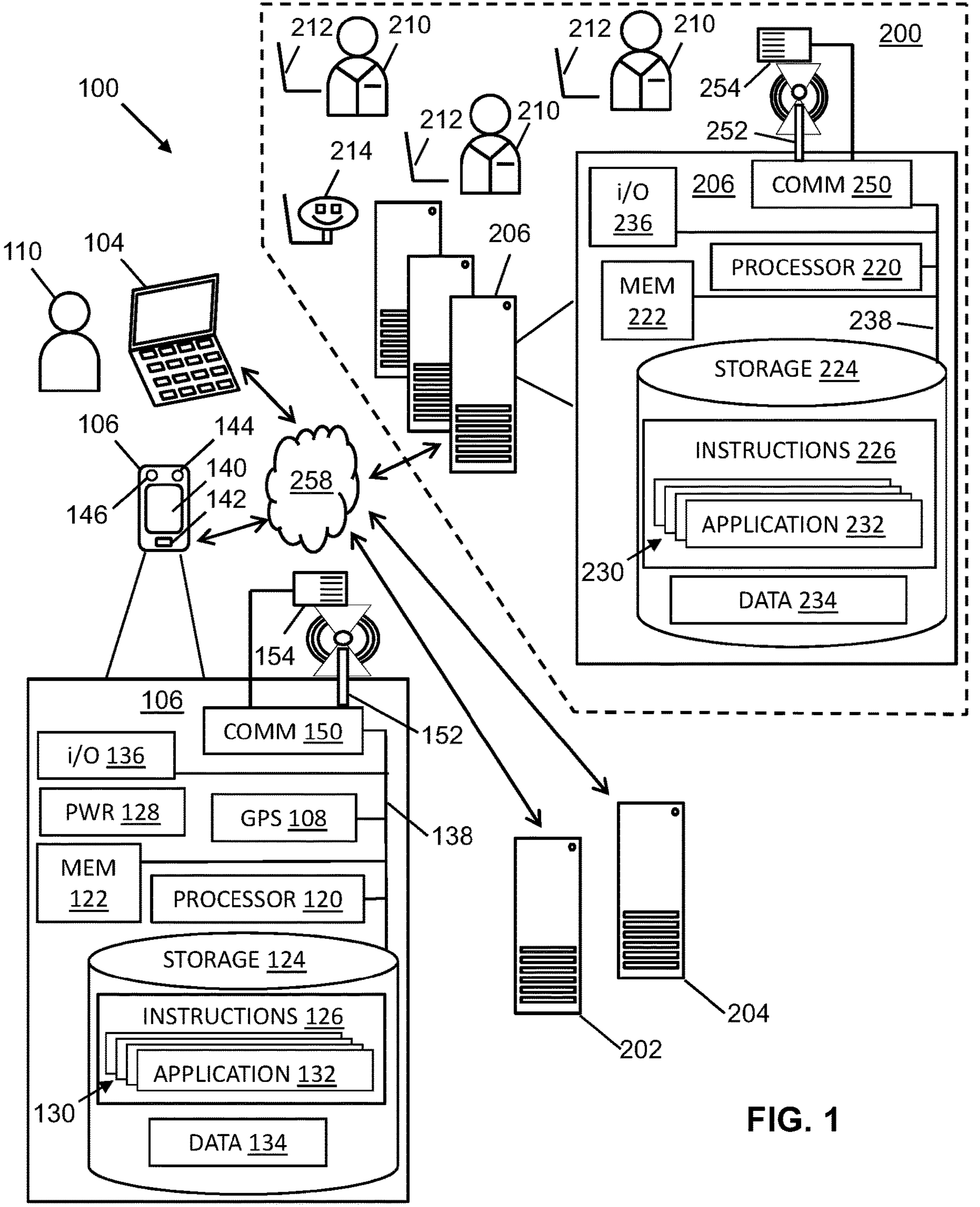

Having thus described embodiments of the invention in general terms, reference will now be made to the accompanying drawings, wherein:

FIG. 1 illustrates an enterprise system, and environment thereof, according to at least one embodiment.

FIG. 2A is a diagram of a feedforward network, according to at least one embodiment, utilized in machine learning FIG. 2B is a diagram of a convolution neural network, according to at least one embodiment, utilized in machine learning.

FIG. 2C is a diagram of a portion of the convolution neural network of FIG. 2B, according to at least one embodiment, illustrating assigned weights at connections or neurons.

Figure 3:
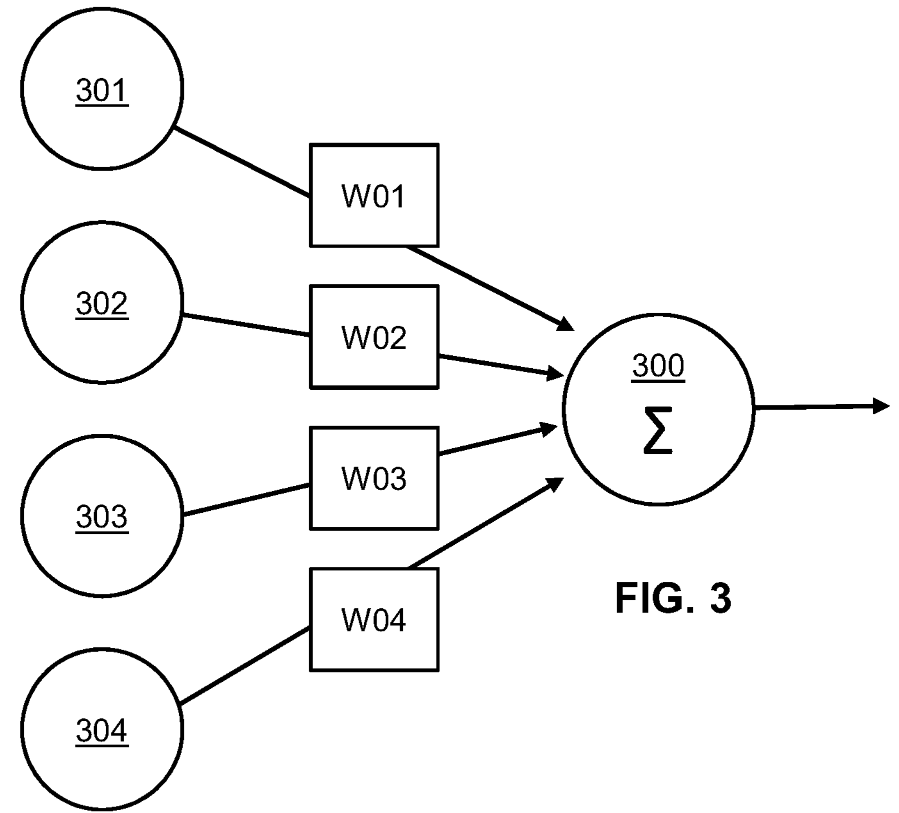

FIG. 3 is a diagram representing an exemplary weighted sum computation in a node in an artificial neural network.

Figure 4:
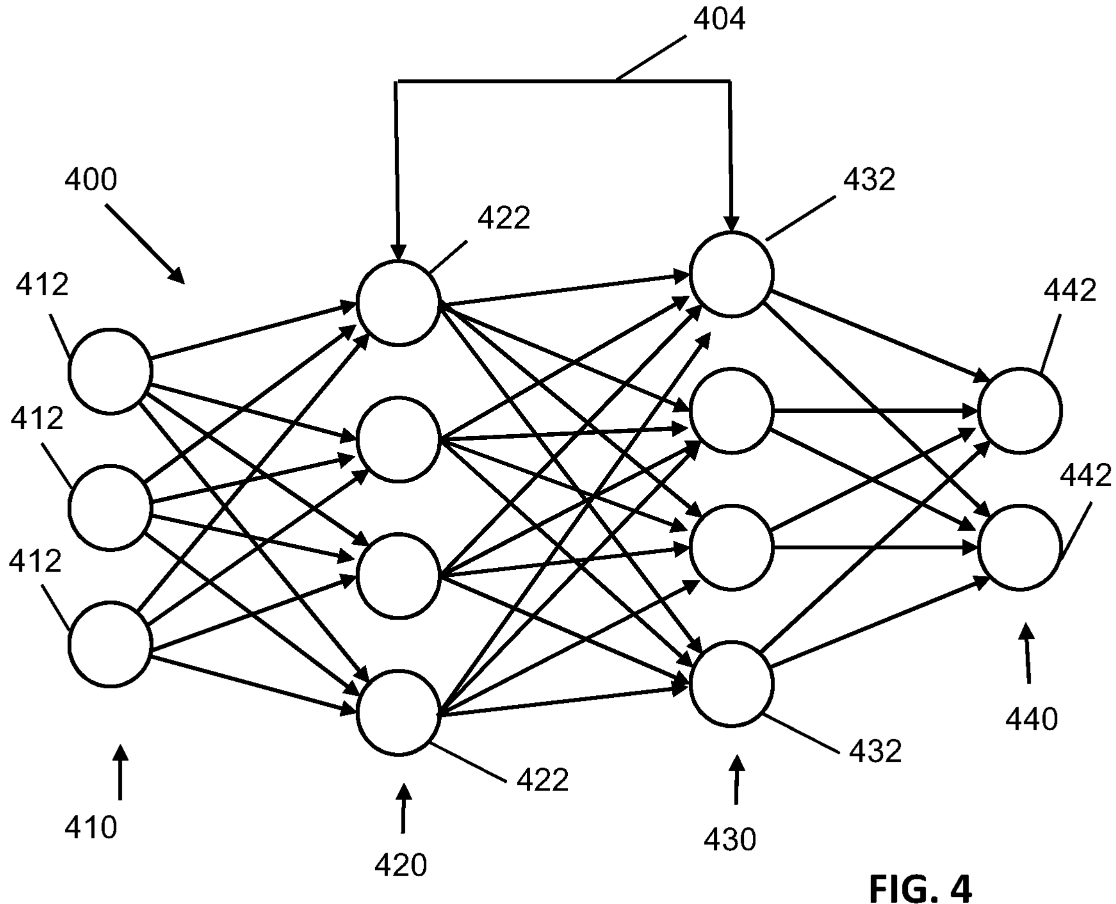

FIG. 4 is a diagram of a Recurrent Neural Network RNN, according to at least one embodiment, utilized in machine learning.

Figure 5:
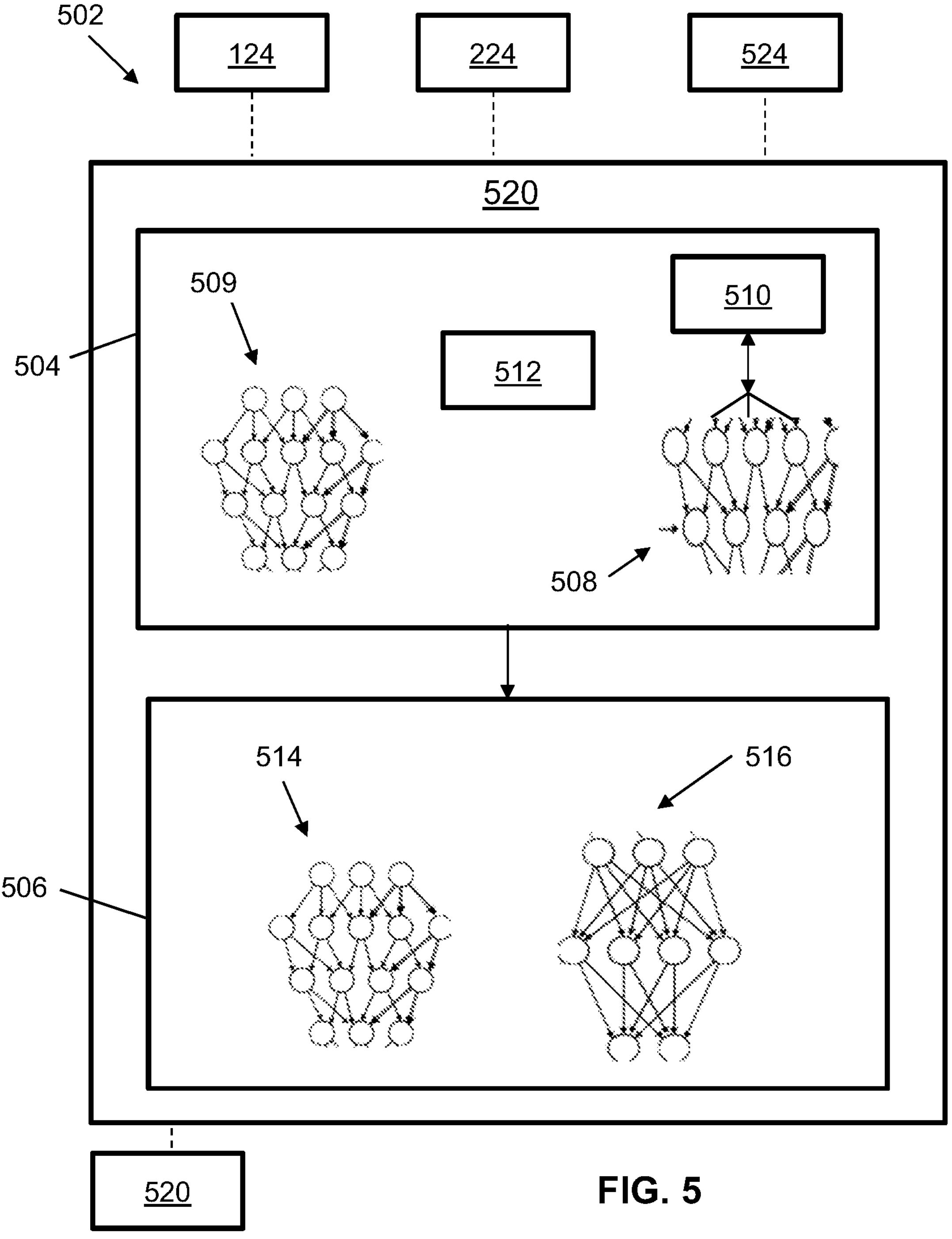

FIG. 5 is a schematic logic diagram of an artificial intelligence program including a front-end and a back-end algorithm.

Figure 6:
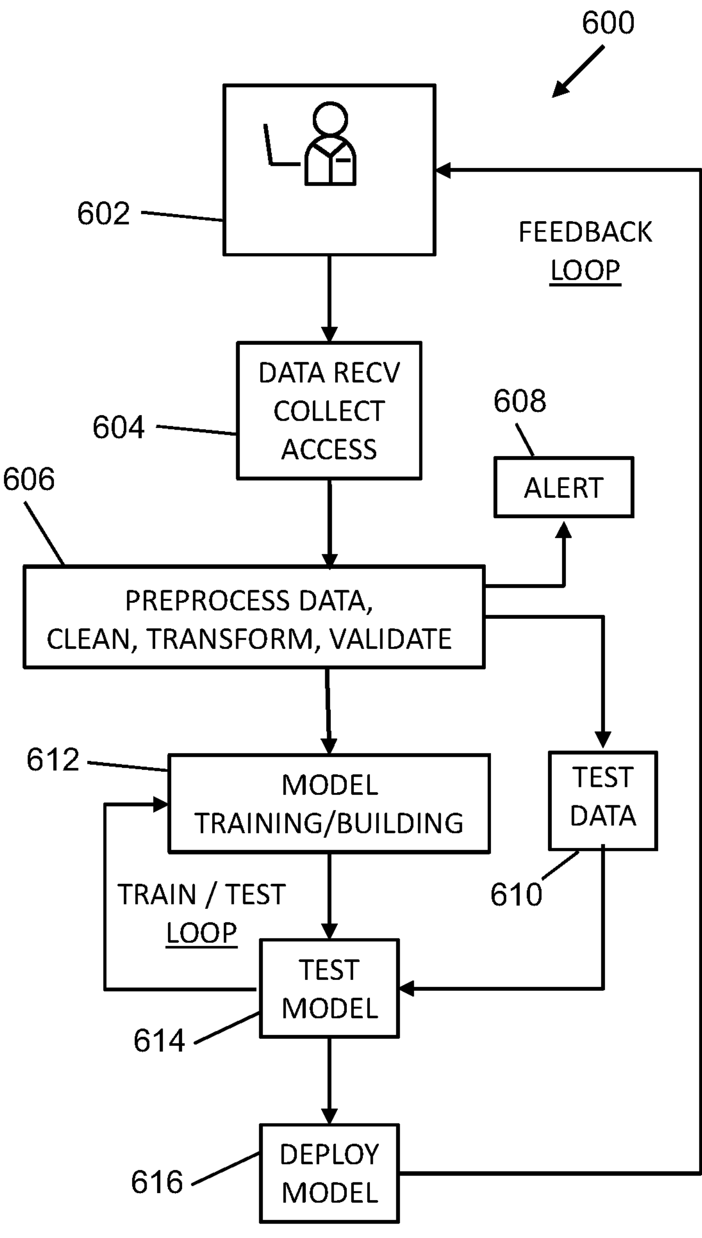

FIG. 6 is a flow chart representing a method, according to at least one embodiment, of model development and deployment by machine learning.

Figure 7:
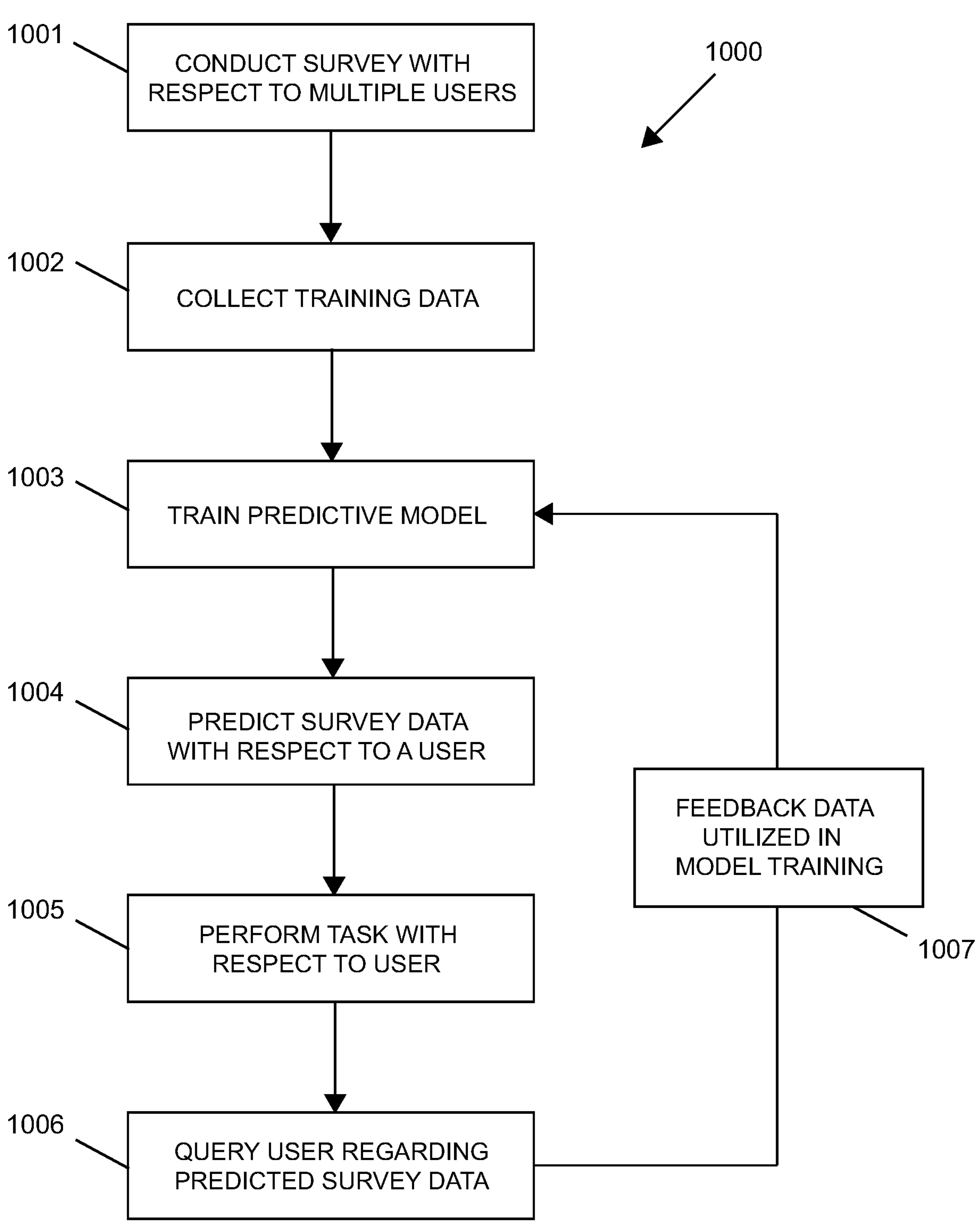

FIG. 7 is a flow chart representing a method, according to at least one embodiment, of predicting the survey related data of a user based on a personal data profile of the user.

Figure 8:
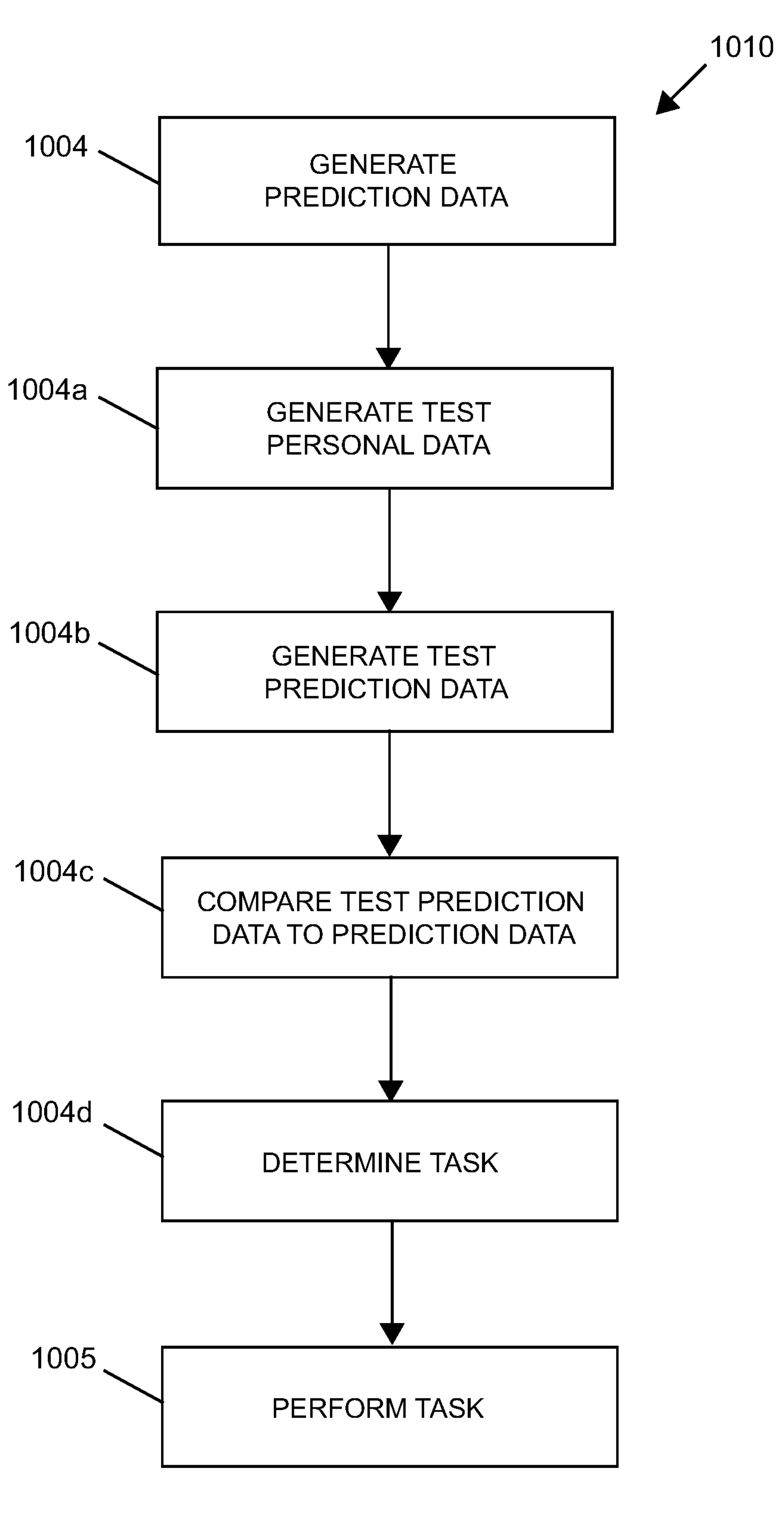

FIG. 8 is a flow chart representing a method, according to at least one embodiment, of determining an appropriate action for a computing system to take based on the predictions of a predictive model.

Figure 9:
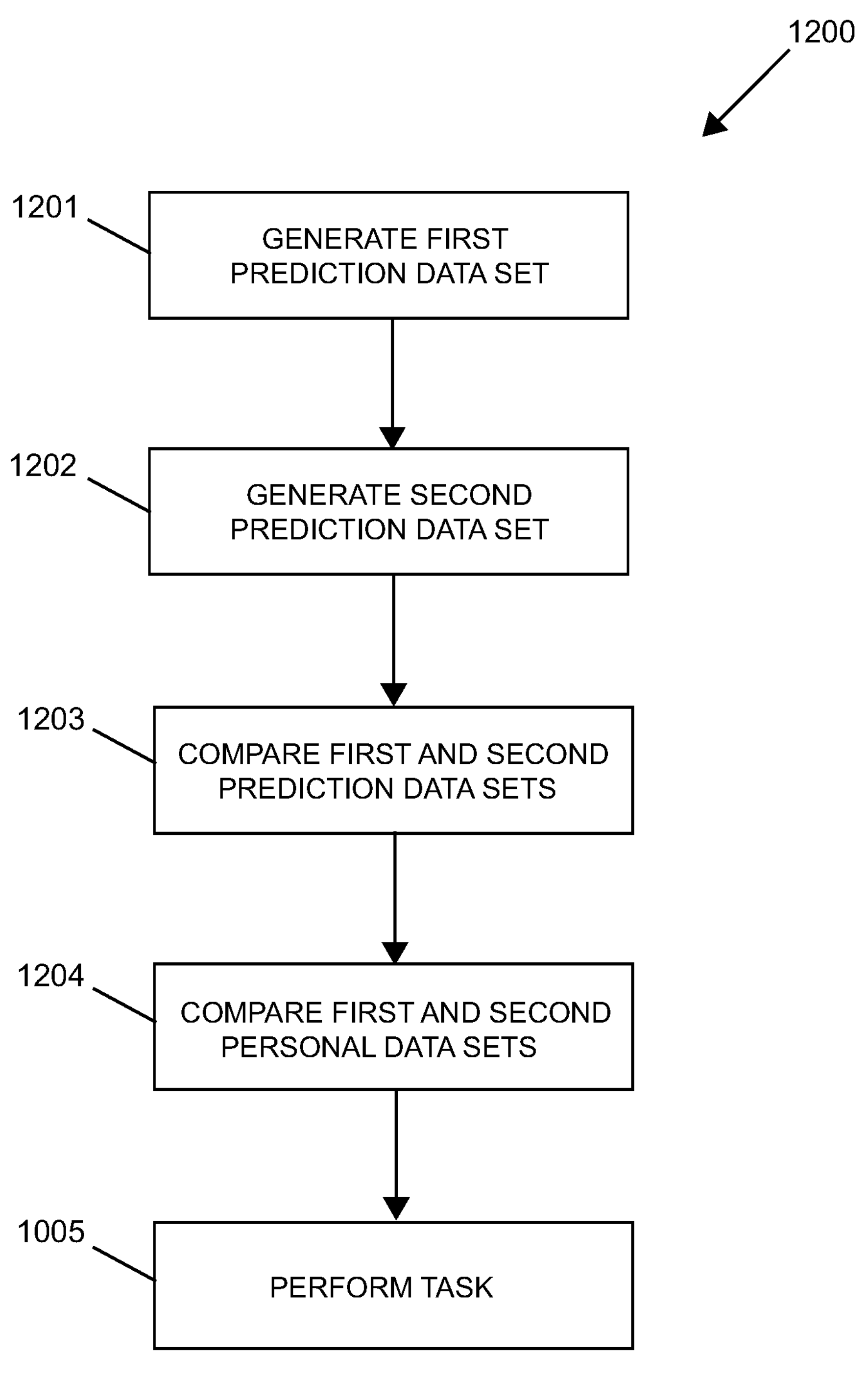

FIG. 9 is a flow chart representing a method, according to at least one embodiment, of evaluating a change in personal data of a user for determining an appropriate action for the computing system to take in reaction to the change in personal data.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Unless described or implied as exclusive alternatives, features throughout the drawings and descriptions should be taken as cumulative, such that features expressly associated with some particular embodiments can be combined with other embodiments. Unless defined otherwise, technical and scientific terms used herein have the same meaning as commonly understood to one of ordinary skill in the art to which the presently disclosed subject matter pertains.

The exemplary embodiments are provided so that this disclosure will be both thorough and complete, and will fully convey the scope of the invention and enable one of ordinary skill in the art to make, use, and practice the invention.

The terms "coupled," "fixed," "attached to," "communicatively coupled to," "operatively coupled to," and the like refer to both (i) direct connecting, coupling, fixing, attaching, communicatively coupling; and (ii) indirect connecting coupling, fixing, attaching, communicatively coupling via one or more intermediate components or features, unless otherwise specified herein. "Communicatively coupled to" and "operatively coupled to" can refer to physically and/or electrically related components.

Embodiments of the present invention described herein, with reference to flowchart illustrations and/or block diagrams of methods or apparatuses (the term "apparatus" includes systems and computer program products), will be understood such that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the herein described embodiments can be configured without departing from the scope and spirit of the invention. Therefore, it is to be understood that, within the scope of the included claims, the invention may be practiced other than as specifically described herein.

FIG. 1 illustrates a system 100 and environment thereof, according to at least one embodiment, by which a user 110 benefits through use of services and products of an enterprise system 200. The user 110 accesses services and products by use of one or more user devices, illustrated in separate examples as a computing device 104 and a mobile device 106, which may be, as non-limiting examples, a smart phone, a portable digital assistant (PDA), a pager, a mobile television, a gaming device, a laptop computer, a camera, a video recorder, an audio/video player, radio, a GPS device, or any combination of the aforementioned, or other portable device with processing and communication capabilities. In the illustrated example, the mobile device 106 is illustrated in FIG. 1 as having exemplary elements, the below descriptions of which apply as well to the computing device 104, which can be, as non-limiting examples, a desktop computer, a laptop computer, or other user-accessible computing device.

Furthermore, the user device, referring to either or both of the computing device 104 and the mobile device 106, may be or include a workstation, a server, or any other suitable device, including a set of servers, a cloud-based application or system, or any other suitable system, adapted to execute, for example any suitable operating system, including Linux, UNIX, Windows, macOS, iOS, Android and any other known operating system used on personal computers, central computing systems, phones, and other devices.

The user 110 can be an individual, a group, or any entity in possession of or having access to the user device, referring to either or both of the mobile device 104 and computing device 106, which may be personal or public items. Although the user 110 may be singly represented in some drawings, at least in some embodiments according to these descriptions the user 110 is one of many such that a market or community of users, consumers, customers, business entities, government entities, clubs, and groups of any size are all within the scope of these descriptions.

The user device, as illustrated with reference to the mobile device 106, includes components such as, at least one of each of a processing device 120, and a memory device 122 for processing use, such as random access memory (RAM), and read-only memory (ROM). The illustrated mobile device 106 further includes a storage device 124 including at least one of a non-transitory storage medium, such as a microdrive, for long-term, intermediate-term, and short-term storage of computer-readable instructions 126 for execution by the processing device 120. For example, the instructions 126 can include instructions for an operating system and various applications or programs 130, of which the application 132 is represented as a particular example. The storage device 124 can store various other data items 134, which can include, as non-limiting examples, cached data, user files such as those for pictures, audio and/or video recordings, files downloaded or received from other devices, and other data items preferred by the user or required or related to any or all of the applications or programs 130.

The memory device 122 is operatively coupled to the processing device 120. As used herein, memory includes any computer readable medium to store data, code, or other information. The memory device 122 may include volatile memory, such as volatile Random Access Memory (RAM) including a cache area for the temporary storage of data. The memory device 122 may also include non-volatile memory, which can be embedded and/or may be removable. The non-volatile memory can additionally or alternatively include an electrically erasable programmable read-only memory (EEPROM), flash memory or the like.

The memory device 122 and storage device 124 can store any of a number of applications which comprise computer-executable instructions and code executed by the processing device 120 to implement the functions of the mobile device 106 described herein. For example, the memory device 122 may include such applications as a conventional web browser application. These applications also typically provide a graphical user interface (GUI) on the display 140 that allows the user 110 to communicate with the mobile device 106, and, for example a mobile banking system, and/or other devices or systems. In one embodiment, when the user 110 decides to enroll in a mobile banking program, the user 110 downloads or otherwise obtains the mobile banking system client application from a mobile banking system, for example enterprise system 200, or from a distinct application server. In other embodiments, the user 110 interacts with a mobile banking system via a web browser application capable of performing the same or similar tasks to the mobile banking system client application. As used hereinafter, each of the software application associated with the enterprise system 200 and the analogous web browser application capable of performing the same or similar tasks are denoted by reference numeral 132, which may refer to a mobile banking system client application capable of operating on either of the user devices 104, 106.

The processing device 120, and other processors described herein, generally include circuitry for implementing communication and/or logic functions of the mobile device 106. For example, the processing device 120 may include a digital signal processor, a microprocessor, and various analog to digital converters, digital to analog converters, and/or other support circuits. Control and signal processing functions of the mobile device 106 are allocated between these devices according to their respective capabilities. The processing device 120 thus may also include the functionality to encode and interleave messages and data prior to modulation and transmission. The processing device 120 can additionally include an internal data modem. Further, the processing device 120 may include functionality to operate one or more software programs, which may be stored in the memory device 122. For example, the processing device 120 may be capable of operating a connectivity program, such as the previously described web browser application. The web browser application may then allow the mobile device 106 to transmit and receive web content, such as, for example, location-based content and/or other web page content, according to a Wireless Application Protocol (WAP), Hypertext Transfer Protocol (HTTP), and/or the like. The application 132 related to the enterprise system 200 may be configured to operate in similar fashion for transmitting such web content.

The memory device 122 and storage device 124 can each also store any of a number of pieces of information, and data, used by the user device and the applications and devices that facilitate functions of the user device, or are in communication with the user device, to implement the functions described herein and others not expressly described. For example, the storage device may include such data as user authentication information, etc.

The processing device 120, in various examples, can operatively perform calculations, can process instructions for execution, and can manipulate information. The processing device 120 can execute machine-executable instructions stored in the storage device 124 and/or memory device 122 to thereby perform methods and functions as described or implied herein, for example by one or more corresponding flow charts expressly provided or implied as would be understood by one of ordinary skill in the art to which the subject matters of these descriptions pertain. The processing device 120 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof. In some embodiments, particular portions or steps of methods and functions described herein are performed in whole or in part by way of the processing device 120, while in other embodiments methods and functions described herein include cloud-based computing in whole or in part such that the processing device 120 facilitates local operations including, as non-limiting examples, communication, data transfer, and user inputs and outputs such as receiving commands from and providing displays to the user.

The mobile device 106, as illustrated, includes an input and output system 136, referring to, including, or operatively coupled with, user input devices and user output devices, which are operatively coupled to the processing device 120. The user output devices include a display 140 (e.g., a liquid crystal display or the like), which can be, as a non-limiting example, a touch screen of the mobile device 106, which serves both as an output device, by providing graphical and text indicia and presentations for viewing by one or more user 110, and as an input device, by providing virtual buttons, selectable options, a virtual keyboard, and other indicia that, when touched, control the mobile device 106 by user action. The user output devices include a speaker 144 or other audio device. The user input devices, which allow the mobile device 106 to receive data and actions such as button manipulations and touches from a user such as the user 110, may include any of a number of devices allowing the mobile device 106 to receive data from a user, such as a keypad, keyboard, touch-screen, touchpad, microphone 142, mouse, joystick, other pointer device, button, soft key, and/or other input device(s). The user interface may also include a camera 146, such as a digital camera.

Further non-limiting examples include, one or more of each, any, and all of a wireless or wired keyboard, a mouse, a touchpad, a button, a switch, a light, an LED, a buzzer, a bell, a printer and/or other user input devices and output devices for use by or communication with the user 110 in accessing, using, and controlling, in whole or in part, the user device, referring to either or both of the computing device 104 and a mobile device 106. Inputs by one or more user 110 can thus be made via voice, text or graphical indicia selections. For example, such inputs in some examples correspond to user-side actions and communications seeking services and products of the enterprise system 200, and at least some outputs in such examples correspond to data representing enterprise-side actions and communications in two-way communications between a user 110 and an enterprise system 200.

The mobile device 106 may also include a positioning device 108, which can be for example a global positioning system device (GPS) configured to be used by a positioning system to determine a location of the mobile device 106. For example, the positioning system device 108 may include a GPS transceiver. In some embodiments, the positioning system device 108 includes an antenna, transmitter, and receiver. For example, in one embodiment, triangulation of cellular signals may be used to identify the approximate location of the mobile device 106. In other embodiments, the positioning device 108 includes a proximity sensor or transmitter, such as an RFID tag, that can sense or be sensed by devices known to be located proximate a merchant or other location to determine that the consumer mobile device 106 is located proximate these known devices.

In the illustrated example, a system intraconnect 138, connects, for example electrically, the various described, illustrated, and implied components of the mobile device 106. The intraconnect 138, in various non-limiting examples, can include or represent, a system bus, a high-speed interface connecting the processing device 120 to the memory device 122, individual electrical connections among the components, and electrical conductive traces on a motherboard common to some or all of the above-described components of the user device. As discussed herein, the system intraconnect 138 may operatively couple various components with one another, or in other words, electrically connects those components, either directly or indirectly—by way of intermediate component(s)—with one another.

The user device, referring to either or both of the computing device 104 and the mobile device 106, with particular reference to the mobile device 106 for illustration purposes, includes a communication interface 150, by which the mobile device 106 communicates and conducts transactions with other devices and systems. The communication interface 150 may include digital signal processing circuitry and may provide two-way communications and data exchanges, for example wirelessly via wireless communication device 152, and for an additional or alternative example, via wired or docked communication by mechanical electrically conductive connector 154. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless communication device 152, which can be or include a radio-frequency transceiver, a Bluetooth device, Wi-Fi device, a Near-field communication device, and other transceivers. In addition, GPS (Global Positioning System) may be included for navigation and location-related data exchanges, ingoing and/or outgoing. Communications may also or alternatively be conducted via the connector 154 for wired connections such by USB, Ethernet, and other physically connected modes of data transfer.

The processing device 120 is configured to use the communication interface 150 as, for example, a network interface to communicate with one or more other devices on a network. In this regard, the communication interface 150 utilizes the wireless communication device 152 as an antenna operatively coupled to a transmitter and a receiver (together a "transceiver") included with the communication interface 150. The processing device 120 is configured to provide signals to and receive signals from the transmitter and receiver, respectively. The signals may include signaling information in accordance with the air interface standard of the applicable cellular system of a wireless telephone network. In this regard, the mobile device 106 may be configured to operate with one or more air interface standards, communication protocols, modulation types, and access types. By way of illustration, the mobile device 106 may be configured to operate in accordance with any of a number of first, second, third, fourth, fifth-generation communication protocols and/or the like. For example, the mobile device 106 may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols such as Long-Term Evolution (LTE), fifth-generation (5G) wireless communication protocols, Bluetooth Low Energy (BLE) communication protocols such as Bluetooth 5.0, ultra-wideband (UWB) communication protocols, and/or the like. The mobile device 106 may also be configured to operate in accordance with non-cellular communication mechanisms, such as via a wireless local area network (WLAN) or other communication/data networks.

The communication interface 150 may also include a payment network interface. The payment network interface may include software, such as encryption software, and hardware, such as a modem, for communicating information to and/or from one or more devices on a network. For example, the mobile device 106 may be configured so that it can be used as a credit or debit card by, for example, wirelessly communicating account numbers or other authentication information to a terminal of the network. Such communication could be performed via transmission over a wireless communication protocol such as the Near-field communication protocol.

The mobile device 106 further includes a power source 128, such as a battery, for powering various circuits and other devices that are used to operate the mobile device 106. Embodiments of the mobile device 106 may also include a clock or other timer configured to determine and, in some cases, communicate actual or relative time to the processing device 120 or one or more other devices. For further example, the clock may facilitate timestamping transmissions, receptions, and other data for security, authentication, logging, polling, data expiry, and forensic purposes.

System 100 as illustrated diagrammatically represents at least one example of a possible implementation, where alternatives, additions, and modifications are possible for performing some or all of the described methods, operations and functions. Although shown separately, in some embodiments, two or more systems, servers, or illustrated components may utilized. In some implementations, the functions of one or more systems, servers, or illustrated components may be provided by a single system or server. In some embodiments, the functions of one illustrated system or server may be provided by multiple systems, servers, or computing devices, including those physically located at a central facility, those logically local, and those located as remote with respect to each other.

The enterprise system 200 can offer any number or type of services and products to one or more users 110. In some examples, an enterprise system 200 offers products. In some examples, an enterprise system 200 offers services. Use of "service(s)" or "product(s)" thus relates to either or both in these descriptions. With regard, for example, to online information and financial services, "service" and "product" are sometimes termed interchangeably. In non-limiting examples, services and products include retail services and products, information services and products, custom services and products, predefined or pre-offered services and products, consulting services and products, advising services and products, forecasting services and products, internet products and services, social media, and financial services and products, which may include, in non-limiting examples, services and products relating to banking, checking, savings, investments, credit cards, automatic-teller machines, debit cards, loans, mortgages, personal accounts, business accounts, account management, credit reporting, credit requests, and credit scores.

To provide access to, or information regarding, some or all the services and products of the enterprise system 200, automated assistance may be provided by the enterprise system 200. For example, automated access to user accounts and replies to inquiries may be provided by enterprise-side automated voice, text, and graphical display communications and interactions. In at least some examples, any number of human agents 210, can be employed, utilized, authorized or referred by the enterprise system 200. Such human agents 210 can be, as non-limiting examples, point of sale or point of service (POS) representatives, online customer service assistants available to users 110, advisors, managers, sales team members, and referral agents ready to route user requests and communications to preferred or particular other agents, human or virtual.

Human agents 210 may utilize agent devices 212 to serve users in their interactions to communicate and take action. The agent devices 212 can be, as non-limiting examples, computing devices, kiosks, terminals, smart devices such as phones, and devices and tools at customer service counters and windows at POS locations. In at least one example, the diagrammatic representation of the components of the user device 106 in FIG. 1 applies as well to one or both of the computing device 104 and the agent devices 212.

Agent devices 212 individually or collectively include input devices and output devices, including, as non-limiting examples, a touch screen, which serves both as an output device by providing graphical and text indicia and presentations for viewing by one or more agent 210, and as an input device by providing virtual buttons, selectable options, a virtual keyboard, and other indicia that, when touched or activated, control or prompt the agent device 212 by action of the attendant agent 210. Further non-limiting examples include, one or more of each, any, and all of a keyboard, a mouse, a touchpad, a joystick, a button, a switch, a light, an LED, a microphone serving as input device for example for voice input by a human agent 210, a speaker serving as an output device, a camera serving as an input device, a buzzer, a bell, a printer and/or other user input devices and output devices for use by or communication with a human agent 210 in accessing, using, and controlling, in whole or in part, the agent device 212.

Inputs by one or more human agents 210 can thus be made via voice, text or graphical indicia selections. For example, some inputs received by an agent device 212 in some examples correspond to, control, or prompt enterprise-side actions and communications offering services and products of the enterprise system 200, information thereof, or access thereto. At least some outputs by an agent device 212 in some examples correspond to, or are prompted by, user-side actions and communications in two-way communications between a user 110 and an enterprise-side human agent 210.

From a user perspective experience, an interaction in some examples within the scope of these descriptions begins with direct or first access to one or more human agents 210 in person, by phone, or online for example via a chat session or website function or feature. In other examples, a user is first assisted by a virtual agent 214 of the enterprise system 200, which may satisfy user requests or prompts by voice, text, or online functions, and may refer users to one or more human agents 210 once preliminary determinations or conditions are made or met.

A computing system 206 of the enterprise system 200 may include components such as, at least one of each of a processing device 220, and a memory device 222 for processing use, such as random access memory (RAM), and read-only memory (ROM). The illustrated computing system 206 further includes a storage device 224 including at least one non-transitory storage medium, such as a microdrive, for long-term, intermediate-term, and short-term storage of computer-readable instructions 226 for execution by the processing device 220. For example, the instructions 226 can include instructions for an operating system and various applications or programs 230, of which the application 232 is represented as a particular example. The storage device 224 can store various other data 234, which can include, as non-limiting examples, cached data, and files such as those for user accounts, user profiles, account balances, and transaction histories, files downloaded or received from other devices, and other data items preferred by the user or required or related to any or all of the applications or programs 230.

The computing system 206, in the illustrated example, includes an input/output system 236, referring to, including, or operatively coupled with input devices and output devices such as, in a non-limiting example, agent devices 212, which have both input and output capabilities.

In the illustrated example, a system intraconnect 238 electrically connects the various above-described components of the computing system 206. In some cases, the intraconnect 238 operatively couples components to one another, which indicates that the components may be directly or indirectly connected, such as by way of one or more intermediate components. The intraconnect 238, in various non-limiting examples, can include or represent, a system bus, a high-speed interface connecting the processing device 220 to the memory device 222, individual electrical connections among the components, and electrical conductive traces on a motherboard common to some or all of the above-described components of the user device.

The computing system 206, in the illustrated example, includes a communication interface 250, by which the computing system 206 communicates and conducts transactions with other devices and systems. The communication interface 250 may include digital signal processing circuitry and may provide two-way communications and data exchanges, for example wirelessly via wireless device 252, and for an additional or alternative example, via wired or docked communication by mechanical electrically conductive connector 254. Communications may be conducted via various modes or protocols, of which GSM voice calls, SMS, EMS, MMS messaging, TDMA, CDMA, PDC, WCDMA, CDMA2000, and GPRS, are all non-limiting and non-exclusive examples. Thus, communications can be conducted, for example, via the wireless device 252, which can be or include a radio-frequency transceiver, a Bluetooth device, Wi-Fi device, Near-field communication device, and other transceivers. In addition, GPS (Global Positioning System) may be included for navigation and location-related data exchanges, ingoing and/or outgoing. Communications may also or alternatively be conducted via the connector 254 for wired connections such as by USB, Ethernet, and other physically connected modes of data transfer.

The processing device 220, in various examples, can operatively perform calculations, can process instructions for execution, and can manipulate information. The processing device 220 can execute machine-executable instructions stored in the storage device 224 and/or memory device 222 to thereby perform methods and functions as described or implied herein, for example by one or more corresponding flow charts expressly provided or implied as would be understood by one of ordinary skill in the art to which the subjects matters of these descriptions pertain. The processing device 220 can be or can include, as non-limiting examples, a central processing unit (CPU), a microprocessor, a graphics processing unit (GPU), a microcontroller, an application-specific integrated circuit (ASIC), a programmable logic device (PLD), a digital signal processor (DSP), a field programmable gate array (FPGA), a state machine, a controller, gated or transistor logic, discrete physical hardware components, and combinations thereof.

Furthermore, the computing device 206, may be or include a workstation, a server, or any other suitable device, including a set of servers, a cloud-based application or system, or any other suitable system, adapted to execute, for example any suitable operating system, including Linux, UNIX, Windows, macOS, iOS, Android, and any known other operating system used on personal computer, central computing systems, phones, and other devices.

The user devices, referring to either or both of the mobile device 104 and computing device 106, the agent devices 212, and the enterprise computing system 206, which may be one or any number centrally located or distributed, are in communication through one or more networks, referenced as network 258 in FIG. 1.

Network 258 provides wireless or wired communications among the components of the system 100 and the environment thereof, including other devices local or remote to those illustrated, such as additional mobile devices, servers, and other devices communicatively coupled to network 258, including those not illustrated in FIG. 1. The network 258 is singly depicted for illustrative convenience, but may include more than one network without departing from the scope of these descriptions. In some embodiments, the network 258 may be or provide one or more cloud-based services or operations. The network 258 may be or include an enterprise or secured network, or may be implemented, at least in part, through one or more connections to the Internet. A portion of the network 258 may be a virtual private network (VPN) or an Intranet. The network 258 can include wired and wireless links, including, as non-limiting examples, 802.11a/b/g/n/ac, 802.20, WiMax, LTE, and/or any other wireless link. The network 258 may include any internal or external network, networks, sub-network, and combinations of such operable to implement communications between various computing components within and beyond the illustrated environment 100. The network 258 may communicate, for example, Internet Protocol (IP) packets, Frame Relay frames, Asynchronous Transfer Mode (ATM) cells, voice, video, data, and other suitable information between network addresses. The network 258 may also include one or more local area networks (LANs), radio access networks (RANs), metropolitan area networks (MANs), wide area networks (WANs), all or a portion of the internet and/or any other communication system or systems at one or more locations.

Two external systems 202 and 204 are expressly illustrated in FIG. 1, representing any number and variety of data sources, users, consumers, customers, business entities, banking systems, government entities, clubs, and groups of any size are all within the scope of the descriptions. In at least one example, the external systems 202 and 204 represent automatic teller machines (ATMs) utilized by the enterprise system 200 in serving users 110. In another example, the external systems 202 and 204 represent payment clearinghouse or payment rail systems for processing payment transactions, and in another example, the external systems 202 and 204 represent third party systems such as merchant systems configured to interact with the user device 106 during transactions and also configured to interact with the enterprise system 200 in back-end transactions clearing processes.

In certain embodiments, one or more of the systems such as the user device 106, the enterprise system 200, and/or the external systems 202 and 204 are, include, or utilize virtual resources. In some cases, such virtual resources are considered cloud resources or virtual machines. Such virtual resources may be available for shared use among multiple distinct resource consumers and in certain implementations, virtual resources do not necessarily correspond to one or more specific pieces of hardware, but rather to a collection of pieces of hardware operatively coupled within a cloud computing configuration so that the resources may be shared as needed.

As used herein, an artificial intelligence system, artificial intelligence algorithm, artificial intelligence module, program, and the like, generally refer to computer implemented programs that are suitable to simulate intelligent behavior (i.e., intelligent human behavior) and/or computer systems and associated programs suitable to perform tasks that typically require a human to perform, such as tasks requiring visual perception, speech recognition, decision-making, translation, and the like. An artificial intelligence system may include, for example, at least one of a series of associated if-then logic statements, a statistical model suitable to map raw sensory data into symbolic categories and the like, or a machine learning program. A machine learning program, machine learning algorithm, or machine learning module, as used herein, is generally a type of artificial intelligence including one or more algorithms that can learn and/or adjust parameters based on input data provided to the algorithm. In some instances, machine learning programs, algorithms, and modules are used at least in part in implementing artificial intelligence (AI) functions, systems, and methods.

Artificial Intelligence and/or machine learning programs may be associated with or conducted by one or more processors, memory devices, and/or storage devices of a computing system or device. The present invention may include a machine learning program that may be executed by the processor 220 of the computing system 206 associated with the enterprise system 200, and may utilize the data 234 stored to the storage device 224. It should be appreciated that the AI algorithm or program may be incorporated within the existing system architecture or be configured as a standalone modular component, controller, or the like communicatively coupled to the system. An AI program and/or machine learning program may generally be configured to perform methods and functions as described or implied herein, for example by one or more corresponding flow charts expressly provided or implied as would be understood by one of ordinary skill in the art to which the subjects matters of these descriptions pertain.

A machine learning program may be configured to implement stored processing, such as decision tree learning, association rule learning, artificial neural networks, recurrent artificial neural networks, long short term memory networks, inductive logic programming, support vector machines, clustering, Bayesian networks, reinforcement learning, representation learning, similarity and metric learning, sparse dictionary learning, genetic algorithms, k-nearest neighbor (KNN), and the like. In some embodiments, the machine learning algorithm may include one or more image recognition algorithms suitable to determine one or more categories to which an input, such as data communicated from a visual sensor or a file in JPEG, PNG or other format, representing an image or portion thereof, belongs. Additionally or alternatively, the machine learning algorithm may include one or more regression algorithms configured to output a numerical value given an input. Further, the machine learning may include one or more pattern recognition algorithms, e.g., a module, subroutine or the like capable of translating text or string characters and/or a speech recognition module or subroutine. In various embodiments, the machine learning module may include a machine learning acceleration logic, e.g., a fixed function matrix multiplication logic, in order to implement the stored processes and/or optimize the machine learning logic training and interface.

One type of algorithm suitable for use in machine learning modules as described herein is an artificial neural network or neural network, taking inspiration from biological neural networks. An artificial neural network can, in a sense, learn to perform tasks by processing examples, without being programmed with any task-specific rules. A neural network generally includes connected units, neurons, or nodes (e.g., connected by synapses) and may allow for the machine learning program to improve performance. A neural network may define a network of functions, which have a graphical relationship. As an example, a feedforward network may be utilized, e.g., an acyclic graph with nodes arranged in layers.

A feedforward network (see, e.g., feedforward network 260 referenced in FIG. 2A) may include a topography with a hidden layer 264 between an input layer 262 and an output layer 266. The input layer 262, having nodes commonly referenced in FIG. 2A as input nodes 204 for convenience, communicates input data, variables, matrices, or the like to the hidden layer 264, having nodes 274. The hidden layer 264 generates a representation and/or transformation of the input data into a form that is suitable for generating output data. Adjacent layers of the topography are connected at the edges of the nodes of the respective layers, but nodes within a layer typically are not separated by an edge. In at least one embodiment of such a feedforward network, data is communicated to the nodes 204 of the input layer, which then communicates the data to the hidden layer 264. The hidden layer 264 may be configured to determine the state of the nodes in the respective layers and assign weight coefficients or parameters of the nodes based on the edges separating each of the layers, e.g., an activation function implemented between the input data communicated from the input layer 262 and the output data communicated to the nodes 276 of the output layer 266. It should be appreciated that the form of the output from the neural network may generally depend on the type of model represented by the algorithm. Although the feedforward network 260 of FIG. 2A expressly includes a single hidden layer 264, other embodiments of feedforward networks within the scope of the descriptions can include any number of hidden layers. The hidden layers are intermediate the input and output layers and are generally where all or most of the computation is done.

Neural networks may perform a supervised learning process where known inputs and known outputs are utilized to categorize, classify, or predict a quality of a future input. However, additional or alternative embodiments of the machine learning program may be trained utilizing unsupervised or semi-supervised training, where none of the outputs or some of the outputs are unknown, respectively. Typically, a machine learning algorithm is trained (e.g., utilizing a training data set) prior to modeling the problem with which the algorithm is associated. Supervised training of the neural network may include choosing a network topology suitable for the problem being modeled by the network and providing a set of training data representative of the problem. Generally, the machine learning algorithm may adjust the weight coefficients until any error in the output data generated by the algorithm is less than a predetermined, acceptable level. For instance, the training process may include comparing the generated output produced by the network in response to the training data with a desired or correct output. An associated error amount may then be determined for the generated output data, such as for each output data point generated in the output layer. The associated error amount may be communicated back through the system as an error signal, where the weight coefficients assigned in the hidden layer are adjusted based on the error signal. For instance, the associated error amount (e.g., a value between −1 and 1) may be used to modify the previous coefficient, e.g., a propagated value. The machine learning algorithm may be considered sufficiently trained when the associated error amount for the output data is less than the predetermined, acceptable level (e.g., each data point within the output layer includes an error amount less than the predetermined, acceptable level). Thus, the parameters determined from the training process can be utilized with new input data to categorize, classify, and/or predict other values based on the new input data.

An additional or alternative type of neural network suitable for use in the machine learning program and/or module is a Convolutional Neural Network (CNN). A CNN is a type of feedforward neural network that may be utilized to model data associated with input data having a grid-like topology. In some embodiments, at least one layer of a CNN may include a sparsely connected layer, in which each output of a first hidden layer does not interact with each input of the next hidden layer. For example, the output of the convolution in the first hidden layer may be an input of the next hidden layer, rather than a respective state of each node of the first layer. CNNs are typically trained for pattern recognition, such as speech processing, language processing, and visual processing. As such, CNNs may be particularly useful for implementing optical and pattern recognition programs required from the machine learning program. A CNN includes an input layer, a hidden layer, and an output layer, typical of feedforward networks, but the nodes of a CNN input layer are generally organized into a set of categories via feature detectors and based on the receptive fields of the sensor, retina, input layer, etc. Each filter may then output data from its respective nodes to corresponding nodes of a subsequent layer of the network. A CNN may be configured to apply the convolution mathematical operation to the respective nodes of each filter and communicate the same to the corresponding node of the next subsequent layer. As an example, the input to the convolution layer may be a multidimensional array of data. The convolution layer, or hidden layer, may be a multidimensional array of parameters determined while training the model.

An exemplary convolutional neural network CNN is depicted and referenced as 280 in FIG. 2B. As in the basic feedforward network 260 of FIG. 2A, the illustrated example of FIG. 2B has an input layer 282 and an output layer 286. However where a single hidden layer 264 is represented in FIG. 2A, multiple consecutive hidden layers 284A, 284B, and 284C are represented in FIG. 2B. The edge neurons represented by white-filled arrows highlight that hidden layer nodes can be connected locally, such that not all nodes of succeeding layers are connected by neurons. FIG. 2C, representing a portion of the convolutional neural network 280 of FIG. 2B, specifically portions of the input layer 282 and the first hidden layer 284A, illustrates that connections can be weighted. In the illustrated example, labels W1 and W2 refer to respective assigned weights for the referenced connections. Two hidden nodes 283 and 285 share the same set of weights W1 and W2 when connecting to two local patches.

Weight defines the impact a node in any given layer has on computations by a connected node in the next layer. FIG. 3 represents a particular node 300 in a hidden layer. The node 300 is connected to several nodes in the previous layer representing inputs to the node 300. The input nodes 301, 302, 303 and 304 are each assigned a respective weight W01, W02, W03, and W04 in the computation at the node 300, which in this example is a weighted sum.

An additional or alternative type of feedforward neural network suitable for use in the machine learning program and/or module is a Recurrent Neural Network (RNN). An RNN may allow for analysis of sequences of inputs rather than only considering the current input data set. RNNs typically include feedback loops/connections between layers of the topography, thus allowing parameter data to be communicated between different parts of the neural network. RNNs typically have an architecture including cycles, where past values of a parameter influence the current calculation of the parameter, e.g., at least a portion of the output data from the RNN may be used as feedback/input in calculating subsequent output data. In some embodiments, the machine learning module may include an RNN configured for language processing, e.g., an RNN configured to perform statistical language modeling to predict the next word in a string based on the previous words. The RNN(s) of the machine learning program may include a feedback system suitable to provide the connection(s) between subsequent and previous layers of the network.

An example for a Recurrent Neural Network RNN is referenced as 400 in FIG. 4. As in the basic feedforward network 260 of FIG. 2A, the illustrated example of FIG. 4 has an input layer 410 (with nodes 412) and an output layer 440 (with nodes 442). However, where a single hidden layer 264 is represented in FIG. 2A, multiple consecutive hidden layers 420 and 430 are represented in FIG. 4 (with nodes 422 and nodes 432, respectively). As shown, the RNN 400 includes a feedback connector 404 configured to communicate parameter data from at least one node 432 from the second hidden layer 430 to at least one node 422 of the first hidden layer 420. It should be appreciated that two or more and up to all of the nodes of a subsequent layer may provide or communicate a parameter or other data to a previous layer of the RNN network 400. Moreover and in some embodiments, the RNN 400 may include multiple feedback connectors 404 (e.g., connectors 404 suitable to communicatively couple pairs of nodes and/or connector systems 404 configured to provide communication between three or more nodes). Additionally or alternatively, the feedback connector 404 may communicatively couple two or more nodes having at least one hidden layer between them, i.e., nodes of nonsequential layers of the RNN 400.

In an additional or alternative embodiment, the machine learning program may include one or more support vector machines. A support vector machine may be configured to determine a category to which input data belongs. For example, the machine learning program may be configured to define a margin using a combination of two or more of the input variables and/or data points as support vectors to maximize the determined margin. Such a margin may generally correspond to a distance between the closest vectors that are classified differently. The machine learning program may be configured to utilize a plurality of support vector machines to perform a single classification. For example, the machine learning program may determine the category to which input data belongs using a first support vector determined from first and second data points/variables, and the machine learning program may independently categorize the input data using a second support vector determined from third and fourth data points/variables. The support vector machine(s) may be trained similarly to the training of neural networks, e.g., by providing a known input vector (including values for the input variables) and a known output classification. The support vector machine is trained by selecting the support vectors and/or a portion of the input vectors that maximize the determined margin.

As depicted, and in some embodiments, the machine learning program may include a neural network topography having more than one hidden layer. In such embodiments, one or more of the hidden layers may have a different number of nodes and/or the connections defined between layers. In some embodiments, each hidden layer may be configured to perform a different function. As an example, a first layer of the neural network may be configured to reduce a dimensionality of the input data, and a second layer of the neural network may be configured to perform statistical programs on the data communicated from the first layer. In various embodiments, each node of the previous layer of the network may be connected to an associated node of the subsequent layer (dense layers). Generally, the neural network(s) of the machine learning program may include a relatively large number of layers, e.g., three or more layers, and are referred to as deep neural networks. For example, the node of each hidden layer of a neural network may be associated with an activation function utilized by the machine learning program to generate an output received by a corresponding node in the subsequent layer. The last hidden layer of the neural network communicates a data set (e.g., the result of data processed within the respective layer) to the output layer. Deep neural networks may require more computational time and power to train, but the additional hidden layers provide multistep pattern recognition capability and/or reduced output error relative to simple or shallow machine learning architectures (e.g., including only one or two hidden layers).

Referring now to FIG. 5 and some embodiments, an AI program 502 may include a front-end algorithm 504 and a back-end algorithm 506. The artificial intelligence program 502 may be implemented on an AI processor 520, such as the processing device 120, the processing device 220, and/or a dedicated processing device. The instructions associated with the front-end algorithm 504 and the back-end algorithm 506 may be stored in an associated memory device and/or storage device of the system (e.g., memory device 124 and/or memory device 224) communicatively coupled to the AI processor 520, as shown. Additionally or alternatively, the system may include one or more memory devices and/or storage devices (represented by memory 524 in FIG. 5) for processing use and/or including one or more instructions necessary for operation of the AI program 502. In some embodiments, the AI program 502 may include a deep neural network (e.g., a front-end network 504 configured to perform pre-processing, such as feature recognition, and a back-end network 506 configured to perform an operation on the data set communicated directly or indirectly to the back-end network 506). For instance, the front-end program 506 can include at least one CNN 508 communicatively coupled to send output data to the back-end network 506.

Additionally or alternatively, the front-end program 504 can include one or more AI algorithms 510, 512 (e.g., statistical models or machine learning programs such as decision tree learning, associate rule learning, recurrent artificial neural networks, support vector machines, and the like). In various embodiments, the front-end program 504 may be configured to include built in training and inference logic or suitable software to train the neural network prior to use (e.g., machine learning logic including, but not limited to, image recognition, mapping and localization, autonomous navigation, speech synthesis, document imaging, or language translation). For example, a CNN 508 and/or AI algorithm 510 may be used for image recognition, input categorization, and/or support vector training. In some embodiments and within the front-end program 504, an output from an AI algorithm 510 may be communicated to a CNN 508 or 509, which processes the data before communicating an output from the CNN 508, 509 and/or the front-end program 504 to the back-end program 506. In various embodiments, the back-end network 506 may be configured to implement input and/or model classification, speech recognition, translation, and the like. For instance, the back-end network 506 may include one or more CNNs (e.g, CNN 514) or dense networks (e.g., dense networks 516), as described herein.

For instance and in some embodiments of the AI program 502, the program may be configured to perform unsupervised learning, in which the machine learning program performs the training process using unlabeled data, e.g., without known output data with which to compare. During such unsupervised learning, the neural network may be configured to generate groupings of the input data and/or determine how individual input data points are related to the complete input data set (e.g., via the front-end program 504). For example, unsupervised training may be used to configure a neural network to generate a self-organizing map, reduce the dimensionally of the input data set, and/or to perform outlier/anomaly determinations to identify data points in the data set that falls outside the normal pattern of the data. In some embodiments, the AI program 502 may be trained using a semi-supervised learning process in which some but not all of the output data is known, e.g., a mix of labeled and unlabeled data, which may also have the same distribution.

In some embodiments, the AI program 502 may be accelerated via a machine learning framework 520 (e.g., hardware). The machine learning framework may include an index of basic operations, subroutines, and the like (primitives) typically implemented by AI and/or machine learning algorithms. Thus, the AI program 502 may be configured to utilize the primitives of the framework 520 to perform some or all of the calculations required by the AI program 502. Primitives suitable for inclusion in the machine learning framework 520 include operations associated with training a convolutional neural network (e.g., pools), tensor convolutions, activation functions, basic algebraic subroutines and programs (e.g., matrix operations, vector operations), numerical method subroutines and programs, and the like.

It should be appreciated that the machine learning program may include variations, adaptations, and alternatives suitable to perform the operations necessary for the system, and the present disclosure is equally applicable to such suitably configured machine learning and/or artificial intelligence programs, modules, etc. For instance, the machine learning program may include one or more long short-term memory (LSTM) RNNs, convolutional deep belief networks, deep belief networks DBNs, and the like. DBNs, for instance, may be utilized to pre-train the weighted characteristics and/or parameters using an unsupervised learning process. Further, the machine learning module may include one or more other machine learning tools (e.g., Logistic Regression (LR), Naive-Bayes, Random Forest (RF), matrix factorization, and support vector machines) in addition to, or as an alternative to, one or more neural networks, as described herein.

FIG. 6 is a flow chart representing a method 600, according to at least one embodiment, of model development and deployment by machine learning. The method 600 represents at least one example of a machine learning workflow in which steps are implemented in a machine learning project.

In step 602, a user authorizes, requests, manages, or initiates the machine-learning workflow. This may represent a user such as human agent, or customer, requesting machine-learning assistance or AI functionality to simulate intelligent behavior (such as a virtual agent) or other machine-assisted or computerized tasks that may, for example, entail visual perception, speech recognition, decision-making, translation, forecasting, predictive modelling, and/or suggestions as non-limiting examples. In a first iteration from the user perspective, step 602 can represent a starting point. However, with regard to continuing or improving an ongoing machine learning workflow, step 602 can represent an opportunity for further user input or oversight via a feedback loop.

In step 604, data is received, collected, accessed, or otherwise acquired and entered as can be termed data ingestion. In step 606 the data ingested in step 604 is pre-processed, for example, by cleaning, and/or transformation such as into a format that the following components can digest. The incoming data may be versioned to connect a data snapshot with the particularly resulting trained model. As newly trained models are tied to a set of versioned data, preprocessing steps are tied to the developed model. If new data is subsequently collected and entered, anew model will be generated. If the preprocessing step 606 is updated with newly ingested data, an updated model will be generated. Step 606 can include data validation, which focuses on confirming that the statistics of the ingested data are as expected, such as that data values are within expected numerical ranges, that data sets are within any expected or required categories, and that data comply with any needed distributions such as within those categories. Step 606 can proceed to step 608 to automatically alert the initiating user, other human or virtual agents, and/or other systems, if any anomalies are detected in the data, thereby pausing or terminating the process flow until corrective action is taken.

In step 610, training test data such as a target variable value is inserted into an iterative training and testing loop. In step 612, model training, a core step of the machine learning work flow, is implemented. A model architecture is trained in the iterative training and testing loop. For example, features in the training test data are used to train the model based on weights and iterative calculations in which the target variable may be incorrectly predicted in an early iteration as determined by comparison in step 614, where the model is tested. Subsequent iterations of the model training, in step 612, may be conducted with updated weights in the calculations.

When compliance and/or success in the model testing in step 614 is achieved, process flow proceeds to step 616, where model deployment is triggered. The model may be utilized in AI functions and programming, for example to simulate intelligent behavior, to perform machine-assisted or computerized tasks, of which visual perception, speech recognition, decision-making, translation, forecasting, predictive modelling, and/or automated suggestion generation serve as non-limiting examples.

The present invention relates to the creation of a predictive model for predicting survey related data based on the training of a machine learning program. The machine learning program of the present invention is described hereinafter as utilizing the data sets associated with a plurality of the users 110 of the enterprise system 200. As mentioned hereinabove, each of the users 110 may be a person or entity acting as a customer or client of the enterprise system 200 that utilizes products and/or services from the enterprise system 200 as defined herein, or may otherwise be a person or entity having an established relationship with the enterprise system 200 such that the enterprise system 200 has access to the necessary personal data regarding each of the participating users 110 for making the determinations described hereinafter. The relationship present between the enterprise system 200 and each of the users 110 may include one or more of the users 110 having an account with the enterprise system 200 wherein certain interactions between the enterprise system 200 and each of the users 110 may be monitored and recorded by the computing system 206, as described in greater detail herein.

The present invention refers to the use of survey data in executing the corresponding machine learning program. Such survey data may refer to data regarding the responses of one of the users 110 of the enterprise system 200 to one or more corresponding surveys, or may collectively refer to the data of a plurality of the users 110 having completed the survey. The user 110 may be alternatively referred to as a respondent of the survey when discussing the survey process hereinafter. Additionally, as used herein, a survey may refer to any set or sets of queries answered by a respondent for the purpose of collecting data regarding the opinions, feelings, thoughts, beliefs, impressions, predictions, and/or observations of the respondent. The survey data may be accumulated using any known method so long as the survey data is recorded in a form configured for use with the computing system 206 and the corresponding machine learning program executed thereon. In some embodiments, the survey may be conducted online via the web browser or software application 132 corresponding to the enterprise system 200 as operating on the user device 104, 106 of the respondent, as desired.

The survey data may originate from any source without necessarily departing from the scope of the present invention. In some embodiments, the survey is conducted by the enterprise system 200 and the resulting survey data is stored to the storage device 224 as one form of the data 234 associated therewith. In other embodiments, the survey data is accumulated by a third party conducting the corresponding survey and the resulting survey data is communicated to the storage device 224 for storage as a form of the data 234. The third party conducting the survey and accumulating the survey data may be representative of one of the external systems 202, 204 shown and described as being in communication with the computing system 206 with reference to FIG. 1. In such a circumstance, the user device 104, 106 of the user 110 may be utilized to conduct the survey via the web browser application or via a software application associated with the third party external system 202, 204 responsible for conducting the survey, and such data may be communicated from the external system 202, 204 to the computing system 206 by any known method, or may alternatively be communicated directly from the user device 104, 106 to the computing system 206, as desired.

The survey may be representative of a financial health assessment survey, as one non-limiting example. The financial health assessment survey may include a methodology for determining a numeric assessment score associated with the financial health of the respondent, which is based on the selections of the respondent when completing the survey. Such a numeric assessment score may be expressed as a value between a certain range, such as between 0-100, as desired. Such a methodology may include the use of a survey algorithm utilizing the responses to the survey by the respondent as input data for determining output data related to the financial assessment of the respondent.

The financial health assessment survey may include queries wherein the respondent is asked to choose one of a plurality of different possible responses (or to enter a response directly, such as a numeric value) with each of the different possible responses weighted to correspond to a specific numeric value or otherwise associated with a specific triggering condition being met with respect to the logic utilized in the executing of the survey algorithm. A response indicative of a triggering condition may refer to a response that informs the logic associated with the evaluation of the survey to determine different or additional queries to pose to the respondent during the conducting of the survey, or may refer to a response that informs the logic to utilize a different weighting or a different set of the survey data in assessing the desired characteristic of the instantaneous respondent, as non-limiting examples.

Such a numeric value or the indication of such a triggering condition may be represented in the survey data associated with the completion of the corresponding survey with respect to each query answered by the respondent in a manner recognizable by the corresponding survey algorithm. Such numeric values or triggering conditions represented in the survey data may then be utilized as input data with respect to the survey algorithm in order to output one or more output data regarding the financial assessment of the respondent, including one or more financial health scores regarding the respondent. Each of the financial health scores may be indicative of a numeric evaluation of the financial health of the respondent with respect to a specific category. Such scores may include a holistic or general financial health score considering all of the responses to the survey in making the numeric determination, or such scores may further include one or more sub-scores associated with only aspects of the survey data, such as identified categories of the survey data.

For example, a respondent may be asked to provide data regarding a level of agreement or disagreement of the respondent with a specific statement, wherein a scale of values (such as a 1-5 scale) is associated with responses ranging from strongly disagreeing to strongly agreeing with the statement. The respondent may also be asked to choose one or more selections from a list of possible selections with each of the different selections similarly weighted with a numeric value or the like upon selection thereof. The survey may include any number of queries of any number of different types (such as having different forms of inputs for the different responses, including the selection of only one or multiple possible selections with respect to one query), and the responses to the queries may include any weighting of the different responses for making a determination via the survey algorithm.

Following completion of the survey by the respondent, the survey algorithm utilizes the responses of the respondent to make a determination of the one or more financial health assessment scores based on the corresponding logic and methodology of the survey algorithm. It should be appreciated that substantially any methodology and logic may be utilized in determining such a score while remaining within the scope of the present invention. In one simple example, each of the different responses includes a numeric value, and the totaling of these numeric values with respect to any set of the responses corresponds to a score associated with that set of responses, such as a score associated with a total of all of the responses to the survey or a score based only on a total of those responses fitting into a certain category.

The queries forming the survey may be divided into categories regarding the habits of the respondent such as spending, saving, borrowing, and planning, as one non-limiting example of possible categorization. One or more of the queries may alternatively be associated with or assigned to multiple different categories, where applicable, and hence may be utilized in determining more than one sub-score. In the event that multiple different scores are determined by the survey algorithm, each of the independent scores may be determined from those responses corresponding to the specific category, such as including only those responses categorized as relating to the corresponding spending, saving, borrowing, or planning habits of the respondent in determining each respective score.

It should be appreciated that the data collected regarding the responses of the respondent may be organized and computed in any number of ways to arrive at any number of different assessments or scores while remaining within the scope of the present invention. However, with respect to certain embodiments of the invention as disclosed herein, the logic and methodology associated with each determination must be known and/or knowable to the computing system 206 in order to make the necessary predictions. The method according to the present invention is also not limited to the determination of a financial health assessment score, as the present invention may be adapted for the analysis of survey data related to substantially any assessment of the respondent with respect to any assessment criteria without necessarily departing from the scope of the present invention.

It should also be apparent that the present invention is also not limited to the generation of a score from the associated survey data, as the individual responses of the respondent as contained within the survey data may be utilized in making a prediction via the disclosed machine learning program absent the calculation of such a score. For example, the machine learning program may be configured to be predictive of some or all of the individual responses to the survey (or certain subsets of responses to the survey) of a particular user 110 without necessarily determining or utilizing such a score, as such predictions may still be of value to the enterprise system 200 in the absence of a numeric assessment of the user 110.

A survey data set associated with each individual user 110 having completed a survey may include a plurality of entries with each of the entries associated with the response to a specific query of the survey or one of the scores calculated as a part of the survey methodology, as non-limiting examples.

The machine learning program utilizes personal data regarding each of the users 110. As used herein, the personal data of each respective user 110 refers to any data specific to that user 110. The personal data set of each of the users 110 may include the survey data set corresponding to that user 110 as a subset of the personal data set thereof, and may include entries relating to each individual response and each determined assessment score resulting from the completion of the survey. The personal data of each of the users 110 of the enterprise system 200 may be in the form of the data 234 stored to the storage device 224 of the computing system 206 at utilized for carrying out the functions of the machine learning program as described herein. The data 234 may originate from various different sources including the responses of the user 110 to queries from the enterprise system 200, the recorded interactions of the user 110 with the enterprise system 200, or one or more third-party and external sources or systems, which may once again be representative of the previously disclosed external systems 202, 204.

The present invention relies upon the enterprise system 200 having access to the personal data associated with each associated user 110 in order to train the machine learning program and subsequently utilize the predictive model generated thereby. In some embodiments, the invention may be carried out with respect to a user 110 having an established account with the enterprise system 200, wherein the establishment of an account may include the user 110 providing at least some of the associated personal data to the enterprise system 200. The enterprise system 200 may collect data regarding the user 110 by directly querying and recording the responses of the user 110. Such data may be entered via use of the web browser application or software application 132 associated with the enterprise system 200, and such information may be entered by the user 110 via use of the user device 104, 106 executing the application 132. The data provided to the enterprise system 200 regarding the user 110 may include, as non-limiting examples, the gender, age, ethnicity, income level, employment status, home ownership status, marital status, citizenship status, etc. of the corresponding user 110. Any available demographic data regarding the user 110 may form a portion of the personal data utilized by the machine learning program with respect the user 110.

If the enterprise system 200 is representative of a financial institution or mobile banking system, the personal data accessible to the enterprise system 200 regarding the user 100 may include data regarding products and/or services offered to the user 110 by the enterprise system 200 relating to banking, checking, savings, investments, credit cards, automatic-teller machines, debit cards, loans, mortgages, personal accounts, business accounts, account management, credit reporting, credit requests, and credit scores, as non-limiting examples. The data may further include files such as those for user accounts, user profiles, user account balances, user transaction histories, user investment portfolios, past communications with the user, or files downloaded or received from other devices such as the user devices 104, 106 of the user 110.

In some circumstances, such as when the enterprise system 200 is representative of a financial institution or mobile banking system offering typical banking services and products, the enterprise system 200 may have access to data regarding the transactions of the user 110 as facilitated by the enterprise system 200. For example, transaction histories regarding purchases carried out via a credit card or debit card associated with the enterprise system 200 may be accessible to the enterprise system 200, as well as current or prior account balances.

The enterprise system 200 may also be configured to monitor and record specific interactions of the user 110 with the enterprise system 200 in attaining additional data regarding the user 110 that may be utilized by the machine learning program disclosed herein. For example, in the event that the user 110 has an account with the enterprise system 200, the user 110 may be required to provide authentication data to the web browser application or software application 132 associated with the enterprise system 200. Following such a login process, the enterprise system 200 may monitor and record the interactions of the identified user 110 with the interface of the corresponding application 132 in order to accumulate data associated with the user 110. For example, the enterprise system 200 may monitor data such as the number of logins to the account of the user 110 in a specified period of time, the frequency of the logins of the user 110, the duration of time the user 110 remains logged into the application 132 (while remaining active), and the types of products and/or services interacted with and/or purchased by the user 110 via navigation of the corresponding application 132. Data may also be recorded regarding the navigation of the application 132, such as recording which resources the user 110 has accessed, how long such resources were accessed, or the like, such as referencing which web addresses associated with the application 132 have been accessed by the user 110 or which files related to the application 132 have been accessed by the user 110.

The personal data regarding the user 110 may also include data relating to the account settings of the user 110 as established with respect to the computing system 206. Such account setting data may be stored to the storage device 224 of the computing system 206 and may be associated with determining how the computing system 206 interacts with the user 110 via the corresponding user device 104, 106. For example, such account setting data may include data relating to the frequency of communications sent from the computing system 206 to the user 110 for access via the user device 104, 106, under what conditions to communicate with the user 110, the content of such communications, or the types or forms of such communications. The change in the account setting may also correspond to a change in the manner in which the user 110 interacts with the computing system 206 via the user device 104, 106, such as changing the manner in which the interface of the web browser application or software application 132 displays information to the user 110 or the information or resources accessible to the user 110 via navigation of the web browser application or software application 132, as non-limiting examples.

In other circumstances, the personal data may be representative of data acquired regarding the user 110 during web related activities, such as tracking a web browsing history of the user 110, as may be provided by "cookies" or similar tools, or tracking certain communications of the user 110, such as monitoring certain aspects of the email activity of the user 110. If web related activities are monitored, such data may correspond to the activities of the user 110 with respect to the webpage or software application 132 associated with the enterprise system 200 or may relate to the activities of the user 110 with respect to third party applications or websites. Such data may be communicated from a corresponding user device 104, 106 used to perform the web browsing to the computing system 206 for storage to the storage device 224 as a form of the data 234.

The enterprise system 200 may also utilize data originating from one of the external systems 202, 204, which may be representative of personal data accumulated with respect to the user 110 external to the enterprise system 200 that is available to or otherwise accessible by the computing system 206 via interaction with one or more of the external systems 202, 204. The external systems 202, 204 may accordingly be representative of third-party data providers configured to communicate data to the computing system 206 regarding the user 110. Such data may include a credit history of the user 110, transactions of the user 110 with respect to other business entities, a criminal history of the user 110, etc., as may originate from sources others than the enterprise system 200. Further examples include data originating from third party social networks or the like, such as check-ins at certain establishments, social connections to other users, posting or commenting histories, or interactions with certain other users or business entities. Data regarding a transaction history of the user 110, whether derived from the relationship between the user 110 and the enterprise system 200 or the user 110 and a third party external system 202, 204, may include data regarding the establishments at which the user 110 has made the purchases, the amounts of such purchases, and potentially additional information regarding the products and/or services related to such purchases. Such data may be available via records of the credit or debit purchases made by the user with respect to certain establishments as monitored by the third party external system 202, 204.

The personal data collected with respect to each user 110 may be categorized as demographic data regarding the user 110, behavioral data regarding the activities of the user 110, or behavioral data regarding the activities of the enterprise system 200 with respect to the user 110 (such as data relating to communications from the enterprise system 200 to the user 110 regarding educational materials or data relating to offers for the purchase of products and/or services). The demographic data generally refers to the data regarding the user 110 that corresponds to a trait or characteristic of the user 110 by which the user 110 may be categorized or classified, whereas the behavioral data generally refers to data regarding the recordation of information regarding the actions of the user 110, the actions of the enterprise system 200, or past interactions or transactions occurring between the enterprise system 200 and the user 110.

A personal data set associated with any individual user 110 may include entries of any the different types of data disclosed hereinabove, including entries relating to demographic data or behavioral data. Each entry of the personal data set may be representative of one of the demographic traits of the user 110 or one of the behavioral traits of the user 110. The number or types of entries available in each personal data set may vary among users 110 depending on the relationship to the enterprise system 200 and the availability of such data.

The data set comprising the personal data sets of each of the plurality of the users 110 of the enterprise system 200 having completed the corresponding survey may collectively be referred to as the training data set associated with the machine learning program. The training data set may be organized based on the methodology of the machine learning program utilized in finding relationships between the personal data and the survey data.

In one embodiment of the present invention, the machine learning program is configured to perform unsupervised learning where the training data set formed by the personal data (including the survey data) of the users 110 is unlabeled with respect to all entries. As such, neither the survey data nor the remaining personal data is representative of a form of known output data during the process of training the machine learning program. Each of the different data entries regarding a specific user 110, whether survey data entries or otherwise personal data entries associated with the user 110, may therefore form an independent unlabeled input for performing the unsupervised learning of the machine learning program.

The personal data entries associated with each user 110 and included in the corresponding personal data set may include any combination of the classifications or categorizations of the personal data described hereinabove while remaining within the scope of the present invention. For example, in some circumstances, the training data may include the demographic personal data of one or more of the users 110. In other circumstances, the training data may include the behavioral data regarding the activities of one or more of the users 110. In other circumstances, the training data may include the behavioral data regarding the activities of the enterprise system 200 with regards to one or more of the users 110. In other circumstances, the training data includes a combination of the listed types of data, such as demographic data and one or both of the identified forms of behavioral data regarding one or more of the users 110. The training data also includes the survey data regarding each of the users 110.

As used hereinafter, all personal data of each user 110 that is utilized in training the machine learning program or performing a prediction via the predictive model generated by the machine learning program may alternatively be referred to as the personal data profile of the corresponding user 110 at the time at which such data is utilized by the machine learning program. For example, one specific user 110 may include a personal data profile including a combination of survey data, demographic data regarding the specific user 110 (age, income, marital status, etc.), and data regarding recorded interactions the specific user 110 has engaged in with the enterprise system 200 (account transaction history, application browsing history, etc.). The personal data profile of the user 110 accordingly is different each time the personal data regarding the user 110 as utilized by the machine learning program changes, such as when certain entries indicate a change in value or a change in state or condition with respect to the personal data set of the user 110.

The machine learning program may be configured to perform cluster analysis wherein the training data constituting the personal data and the corresponding survey data is grouped into subsets (clusters) wherein each cluster is determined by the similarity of the data contained within the cluster with respect to a plurality of the users 110, or the dissimilarity with respect to data not within the cluster with respect to the plurality of the users 110, depending on the methodology utilized. That is, each cluster includes a plurality of the users 110 identified as forming the cluster having met a threshold degree of similarity among the data corresponding to the plurality of the users 110 according to a predefined similarity criteria. This clustering allows for users 110 having a similarity of personal data profile, such as a certain set of demographic traits and behavioral traits based on the corresponding data, to be grouped together along with certain survey data typical of this cluster of the users 110. For example, a cluster of users 110 corresponding to a certain personal data profile (or aspects thereof) may also correspond to those same users 110 having a common or similar response to one of the queries of the survey related to the survey data, or alternatively this cluster may include each of the users 110 having a common or similar assessment score or sub-score as determined by the survey methodology. The unsupervised learning process accordingly allows causality to be implied between a particular personal data profile and a particular result in the survey data by discovering a correlation between such common occurrences of these data within the training data.

The machine learning program may be considered to be a form of classification algorithm based on the ability of the machine learning program to identify classifications of the users 110 associated with the training data set based on the clusters of the users 110 discovered within the training data. The machine learning program may utilize a hidden Markov model in modeling the training data set and forming the predictive model of the machine learning program. The machine learning program may also utilize non-negative matric factorization in performing the above described clustering analysis.

The machine learning program may be configured to determine a probability that a certain personal data profile will correspond to a certain result in the survey data, such as a certain response to the survey or a certain assessment score. The machine learning program may utilize various forms of fuzzy logic to represent the probability of any given result occurring in the survey data when performing the calculations relating to such predictions.

The unsupervised training of the machine learning program includes repeatedly adding new data to the training data set regarding new and additional users 110 having completed the survey. As more data regarding more users 110 are added to the training data set, additional relationships may be discovered within the structure of the data or refinements may be made with respect to already discovered relationships, thereby improving the predictive capabilities of the machine learning program. The training of the machine learning program results in the generation of a predictive model wherein the machine learning program is configured to predict the survey data expected to be associated with a personal data profile of a specific user 110.

The machine learning program may be configured to make predictions (determinations) regarding the results of the survey data when the determined probability of an entry of the survey data occurring as predicted by the predictive model exceeds a threshold value of probability. For example, the machine learning program may only make a definitive determination with respect to an entry of the survey data when the probability of the prediction being correct exceeds 50%. The machine learning program may alternatively be configured to make predictions regarding the results of the survey data when the determined probability for a certain result exceeds the probability of all other possible results with respect to the given survey data. For example, where a multiple choice query is concerned, the selection showing the greatest probability of being correctly predicted may be utilized as the prediction of the predictive model, even where this event is not more likely than not to occur.

Once the machine learning program has been trained to a degree considered suitable for predicting the responses and/or assessment scores associated with the survey data, the machine learning program may be configured to compute and communicate data regarding the predictions of the machine learning program in view of a specific personal data profile, which corresponds to the personal data profile of a specific user 110 of the enterprise system 200. Such a prediction occurs in the absence of the completion of a survey by the specific user 110. Instead, the machine learning program utilizes only the personal data profile of the corresponding user 110 for determining a correlation with an expected response to the survey or an expected assessment score or sub-score. The machine learning program is accordingly able to predict (to some degree of probability) the expected survey data regarding the user 110 (that would otherwise result from the completion of the survey by the user 110) via the exclusive use of the personal data profile of the user 110 when executing the predictive capabilities of the machine learning program.

The data derived from the predictions of the machine learning program are hereinafter referred to as prediction data, and may refer to the data regarding the predictions of the responses/selections of a user 110 to individual queries of the corresponding survey or may refer to the data regarding the predicted score(s) regarding an assessment of the user 110 based on the survey. Such prediction data may be stored as the data 234 of the computing system 206 for use by the enterprise system 200 in making further determinations regarding the user 110 as described hereinafter.

The predictive model of the machine learning program may be configured to predict the individual response to each query of the survey with respect to a corresponding user 110. Assuming that the methodology of the survey algorithm is known by the computing system 206 regarding the generation of an assessment score or sub-score, the determination of an assessment score representing an assessment of the user 110 may accordingly be determined by predicting the response of the user 110 to each individual query used in determining such a score according to the corresponding survey algorithm. Each such predicted response may be assigned a numeric value or may be determined to trigger a condition of the survey algorithm logic in accordance with the same known methodology utilized within the survey algorithm.

By assigning the same values and/or rules to the predicted responses as those applied to the actual responses when a respondent completes the survey, the enterprise system 200 can utilize the same methodology via the corresponding survey algorithm in computing the numeric score associated with the corresponding subset of the survey data. That is, the use of the same methodology in computing the assessment score based on the predicted responses as the methodology used in computing the score based on the actual responses of the respondent results in the same score being generated with respect to either process when the machine learning program correctly predicts the response of the respondent with respect to each relevant query of the subset being utilized. The calculation of such an assessment score may include the use of the prediction data generated by the machine learning program with respect to a specific user 110 as the input data for use in the survey algorithm, which may be stored as instructions 226 within the storage device 224 of the computing system 206, and which may be executed by the processor 220 thereof. The resulting assessment score may then be stored as a form of the data 234.

In alternative embodiments, the machine learning program may instead associate the personal data profile of each of the users 110 directly to the numeric score determined by the survey algorithm in the absence of an independent determination of the numeric score by the computing system 206 based on the recreation of the input to the survey algorithm. The prediction of individual responses to the survey is thus not required for then computing such a score. Instead, the score may be predicted via a correlation between the personal data profile of the instantaneous user 110 and the personal data profiles associated with such scores as determined during the unsupervised training of the machine learning program described above. In other words, the personal data profile of the user 110 may be determined to belong to a cluster of data regarding users 110 having a specific assessment score, hence this assessment score would be predicted to be the assessment score of the corresponding user 110 absent analysis of data regarding individual responses to the survey.

FIG. 7 illustrates a method 1000 of implementing the machine learning program for predicting the survey data with respect to a user 110 of the enterprise system 200 based on the personal data profile of the user 110 according to the present invention. The method includes an initial step 1001 of conducting the survey with respect to a plurality of the users 110 to establish the survey data utilized in the training data set. As mentioned above, the survey may be conducted directly by the enterprise system 200 or by a third party external source 202, 204, and may be initiated at the request of the user 110, the enterprise system 200, or the third party external source 202, 204.

In some embodiments, the enterprise system 200 requests the completion of the survey by a user 110 when the user 110 first establishes a relationship with the enterprise system 200, such as when the user 110 first establishes an account with the enterprise system 200. The use of data related to new users 110 of the enterprise system 200 aids in establishing a benchmark for monitoring the progress of these new users 110 as they continue to have a relationship with the enterprise system 200. In other embodiments, the enterprise system 200 allows for users 110 already having an established relationship with the enterprise system 200 to complete the survey. The use of data of existing customers or clients of the enterprise system 200 allows the training data set to include data regarding the past behaviors of either of the user 110 or the enterprise system 200, or the interactions therebetween, as outlined hereinabove when describing the possible forms of personal data that may be utilized by the machine learning program. In other embodiments, the training data set includes the data of both new and existing customers or clients of the enterprise system 200, with the personal data set of the different users 110 varying in scope.

A step 1002 includes the collection of the training data required for performing the training of the machine learning program as described hereinabove. The collection of the training data includes the collection of the personal data including the corresponding survey data regarding each user 110 having completed the survey. As described hereinabove, such data may originate from any of the described sources 110, 200, 202, 204 and may be communicated to the computing system 206 of the enterprise system 200 using any of the methods or communication channels described hereinabove. Certain proprietary data are also collected directly by the enterprise system 200 as a result of the monitoring of the interactions of the enterprise system 200 and the user 110 as described hereinabove.

A step 1003 includes training the machine learning program utilizing the applicable training data to generate a predictive model having the capabilities described hereinabove. The predictive model may be acquired utilizing any of the machine learning processes described herein without necessarily departing from the scope of the present invention. In the present example, it is assumed that the training of the machine learning program at step 1003 includes the use of unsupervised learning with the personal data and the survey data forming the training data being considered to be unlabeled, which aids in discovering counterintuitive or unexpected relationships between the personal data and the survey data.

A step 1004 includes predicting the survey data with respect to an individual user 110 using the predictive model of the machine learning program as based on the personal data profile of the user 110 at the time of the prediction. The predicting step includes the machine learning program correlating the data profile of the individual user 110 to each of the prescribed elements of the survey data, such as the responses to individual queries or the calculated scores or sub-scores, in order to predict each of the selections or scores of the user 110. The predicting step results in the generation of the prediction data regarding the individual user 110, which may be stored to the storage device 224 of the computing system 206 as a form of the data 234.

A step 1005 includes the computing system 206 of the enterprise system 200 optionally causing an action to take place in reaction to the generation of the prediction data with respect to the user 110. Such actions may relate to a communication being sent to the corresponding user 110 or a change in the behavior of the computing system 206 to reflect the contents of the prediction data. These tasks are elaborated on in greater detail hereinafter.

The machine learning program has been described thus far as utilizing unsupervised learning, but the machine learning program may also be configured to utilize semi-supervised learning in an attempt to create a feedback mechanism for testing the validity of the predictions made by the machine learning program with respect to a specific user 110, and to thereby refine the predictive model of the machine learning program. Specifically, following the above described step 1004 of predicting the survey data with respect to a specific user 110, such prediction data may be evaluated for accuracy by performing a step 1006 of querying the specific user 110 for which the predictions were made regarding the agreement or disagreement of the specific user 110 with the predictions made by the predictive model.

The querying of the specific user 110 may include presenting the user 110 with a request for an impression of the user 110 mirroring that of one of the queries presented on the survey forming the basis of the survey data. The querying of the specific user 110 may therefore include the use of language that is the same or similar to that utilized in the corresponding survey query, or that otherwise communicates the request for the same information as that presented on the survey. For example, the prediction data generated with respect to the specific user 110 may indicate that the specific user 110 is predicted to indicate that he or she strongly agrees with a position posed by one of the queries of the survey. The querying may accordingly include the enterprise system 200 initiating a request that the specific user 110 confirm or deny the strong agreement with this statement, or initiating a request that the user 110 completes a survey query replicating that of the actual survey query to see how the user 110 reacts when given the same selections. The querying step 1006 may, in some circumstances, comprise the specific user 110 completing the entirety of the survey to evaluate each and every aspect of the prediction data regarding the user 110, as desired, including the resulting assessment scores or sub-scores. The querying step 1006 may also only occur with respect to a subset of the users 110 having completed the survey, as desired.

The querying step 1006 may occur via any form of communication occurring between the user device 104, 106 of the user 110 and the computing system 206 of the enterprise system 200. In some embodiments, the user 110 is notified of the querying request and responds to the querying request during navigation of the web browser application or software application 132 associated with the enterprise system 200. The data relating to the responses of the user 110 to such feedback queries is referred to hereinafter as the feedback data associated with the specific user 110 who has been queried. The feedback data forms a feedback data set with respect to each respondent user 110 that may be stored to the storage device 224 as a form of the data 234.

The previously mentioned semi-supervised learning may occur via the use of the feedback data as labeled output data with respect to the training data set. That is, the training data set may now include a combination of the personal data associated with users 110 having completed the survey including the survey data associated with users 110 having completed the survey, the personal data associated with the users 110 who responded to a feedback related query following predictions regarding those users 110, and the feedback data associated with those users 110 who responded to the feedback related query to evaluate the prediction data. All such data may be unlabeled with the exception of the described feedback data. The semi-supervised training of the machine learning program via the introduction of the feedback data into the training data set is represented by step 1007 in FIG. 7, which schematically illustrates the manner in which the feedback data is utilized as a part of the training data set during the training step 1003. The newly trained machine learning program may include a modified predictive model, which is then able to perform the predicting step 1004 in accordance with the methodology of this modified predictive model. The generation of the modified and updated predictive model is further described with reference to the description of the method of FIG. 6, which describes such a process generally. It should also be appreciated that any of the processes described in the explanation of FIG. 6 may be utilized in training and building the predictive model as described herein.

It should be appreciated that the machine learning program may operate in the absence of the semi-supervised learning as relating to steps 1006, 1007, and may instead rely exclusively on the predictive model generated during the unsupervised learning processes described herein without necessarily departing from the scope of the present invention.

The machine learning program has been described thus far as utilizing unsupervised or semi-supervised learning, but the machine learning program may alternatively utilize supervised learning wherein the training data is labeled appropriately for establishing a causal relationship between the input training data in the form of the personal data of each user 110 not forming the survey data and the output training data in the form of the survey data accumulated with respect to that same user 110. The supervised training process of the machine learning program may utilize any of the supervised training processes disclosed herein, including the use of a neural network having at least one hidden layer, without departing from the scope of the present invention.

A variety of different triggering conditions may be utilized by the enterprise system 200 in determining when the machine learning program should execute the predictive aspects of the machine learning program to make a determination of the prediction data with regards to a specific user

110 with respect to step 1004. In some embodiments, the prediction data may be determined with respect to a specific user 110 when such an assessment is requested by the user 110 or manually requested by an agent 210 of the enterprise system 200. For example, the option to have such prediction data generated by the enterprise system 200 (without requiring the completion of the survey by the user 110) may be offered by the enterprise system 200 via the corresponding web browser application or software application 132 associated with the enterprise system 200, wherein a selection of such a feature by the user 110 causes the computing system 206 to initiate the generation of the corresponding prediction data via the execution of the predictive modeling of the machine learning program. Alternatively, the agent 210 may offer the determination of the prediction data when the agent 210 believes that such an assessment may be helpful to the user 110 in assessing the corresponding aspect of the user 110.

In other embodiments, the prediction data may be determined at fixed intervals, or otherwise on a fixed schedule. For example, the prediction data may be determined with respect to each participating user 110 at regular intervals, such as daily, weekly, monthly, or quarterly, or may be preprogrammed to occur on specific dates as requested by the user 110 or agent 210, as non-limiting examples.

In other embodiments, the prediction data may be determined when the personal data profile of the specific user 110, as available for use in training the machine learning program and executing any predictive capabilities thereof, indicates that a triggering condition has occurred that may be indicative of the need for an assessment of the user 110, such as the occurrence of an event shown to have a strong correlation to a change in an assessment of the user 110 regarding the predictions relating to the user 110. For example, the personal data of the user 110 reflecting that the user 110 has reached a certain age may prompt the determination of the prediction data when such a change in age is demonstrated to correlate to a change in the predictive assessment of the user 110, such as when an age is reached where retirement becomes more of a focus for the user 110 and hence the impressions of the user 110 regarding potential survey queries related to this topic may be expected to change.

Personal data specific to and accessible exclusively by the enterprise system 200 may be utilized in determining such a triggering condition. Such personal data may be acquired as a result of the relationship present between the enterprise system 200 and the user 110. For example, if the enterprise system 200 is a financial institution having access to account records, the triggering condition may relate to a certain balance being reached within one of the accounts of the user 110, or to a failure of the user 110 to make a scheduled payment on a debt managed by the enterprise system 200. Such personal data may accordingly refer specifically to interactions between the user 110 and the enterprise system 200 as a part of the relationship present between the user 110 and the enterprise system 200, including data regarding past transactions of the user 110 as initiated by the enterprise system 200 or transactions occurring directly between the user 110 and the enterprise system 200. For example, the enterprise system 200 may utilize data regarding purchases of the user 110 made with entities other than the enterprise system 200 (where such data is available, such as where a financial instrument such as a credit card or debit card associated with the enterprise system 200 is used in making these purchases) or data regarding transactions including payments, agreements, or other contractual obligations made directly between the user 110 and the enterprise system 200 with regards to a product and/or service offered by the enterprise system 200.

Such data may also include data collected by the enterprise system 200 from a third party source where the user 110 has provided express consent for such data to be shared with or otherwise accessible to the enterprise system 200, such as data regarding transactions occurring between the user 110 and entities external to the enterprise system 200 that are not otherwise monitored directly by the enterprise system 200. For example, the enterprise system 200 may have access to data regarding transactions occurring with respect to a credit card or debit card of the user 110 associated with and/or managed by a financial institution other than the enterprise system 200, hence such data must be communicated to the enterprise system 200 for access thereto.

The enterprise system 200 may also utilize personal data collected with respect to the user 110 regarding the interactions of the user 110 with the enterprise system 200 via the corresponding web browser application or software application 132 associated with the enterprise system 200. For example, the navigating of the application 132 may include the user 110 reviewing information relating to certain products and/or services offered by the enterprise system 200, or making a selection that additional information is requested with respect to a topic related to one of the queries of the survey corresponding to the prediction data. Similar data may be collected regarding alternative interactions, such as whether or not the specific user 110 views or responds to email messages, text messages, or the like, as applicable. The determination of the prediction data based on such interactions may aid in proactively assessing the user 110 and offering intervention by the enterprise system 200, such as allowing the enterprise system 200 to offer certain products and/or services when it has been determined that such products and/or services have been reviewed by the user 110 in conjunction with the data profile of the user 110, thereby indicating a need of the user 110 to attain such a product and/or service.

The triggering conditions indicated above may also be complex in nature and may include reference to multiple different variables of the personal data of the user 110 or multiple conditional relationships therebetween. As one example, upon determining that the age of the user 110 has surpassed a certain threshold, an additional variable of the personal data of the user 110, such as the balance of a savings account of the user 110 accessible to the enterprise system 200, may be utilized in determining whether the prediction data must be determined and further utilized. Specifically, with respect to the given example, the triggering of the determination of the prediction data may include the determination being made only if the age of the user 110 meets or exceeds the established threshold and the data regarding the account balance also meets or exceeds the established threshold. It should also be appreciated that the prediction data may be collected based on any combination of any of the above described conditions or events, as desired.

In some embodiments, the computing system 206 of the enterprise system 200 may continuously and automatically determine the prediction data with respect to each participating user 110 whenever the personal data set (profile) of the corresponding user 110, which may include the data regarding the user 110 that has been utilized in training the machine learning program, is indicated as having changed from a previous instance as monitored by the computing system 206. Such a change in data may refer to any of the data entries utilized by the predictive model in making a determination of any prediction data (including the prediction of a financial health assessment score) having a changed state, value, or condition. Such a change may include a changed condition of the corresponding user 110 or the initial receipt of previously unknown or undetermined information. The data that is determined to have changed may be derived from an interaction between the user 110 and the enterprise system 200 or may be acquired by the enterprise system 200 from a third party source 202, 204. This allows the prediction data corresponding to any one user 110 to always be as up to date as possible, thereby provided a semi-real time assessment of the user 110 via the prediction data.

With renewed reference to step 1005 of FIG. 7, the enterprise system 200 may utilize the prediction data determined with respect to each of the participating users 110 for performing a variety of different tasks once such prediction data has been determined. In some circumstances, the prediction data is communicated or otherwise reported directly to the corresponding user 110 for review by the user 110, such as a review of the predicted assessment score(s) or review of the predicted survey responses. In other circumstances, the prediction data is utilized by the enterprise system 200 to make determinations regarding further interactions with the user 110 or changes in behavior of the enterprise system 200, such as whether to intervene by offering certain products and/or services to the user 110 in an attempt to alter the current assessment of the user 110 as indicated by the prediction data.

The prediction data may be communicated to the user 110 using a number of different methods while remaining within the scope of the present invention. In some embodiments, each determination of the prediction data with respect to one of the users 110 causes the computing system 206 to associate such data with the account of the corresponding user 110, as may be associated with the web browser application or software application 132. Such prediction data may then be accessible whenever the user 110 gains access to the account of the user 110, such as may occur via browsing of the web browser application or software application 132. If such determinations are made continuously or automatically each time new or changed personal data is acquired or determined by the computing system 206 with respect to a corresponding user 110, the user 110 is able to access an up to date and semi-real time assessment of the user 110 via access to the web browser application or software application 132. The prediction data communicated to the user 110 may include a holistic score, any sub-scores based on categories of the queries, and potentially any predictions regarding individual responses to individual survey queries.

The prediction data may alternatively be proactively sent to the corresponding user 110 by the enterprise system 200 using any known communication method. For example, an email, text message, push notification, or the like may be generated by the computing system 206 for communication to the corresponding user 110. Such a communication may be communicated from the computing system 206 to the user device 104, 106 of the user 110 using any of the methods described hereinabove in describing the communication capabilities of the devices 104, 106 and systems 200, 206 within FIG. 1. The user 110 may then review such prediction data regarding the corresponding user 110 via interaction with the corresponding user device 104, 106, which provides a perceptible expression of the prediction data. Such a perceptible expression of the prediction data may include the data being visually perceptible, such as in the form of readable text able to be displayed on the user device 104, 106, or audibly perceptible, such as in the form of an audio file able to be played by the user device 104, 106. The display 140 of the user device 106 or the speaker 144 of the user device 106 may be utilized in perceiving the prediction data.

In summary, the determination of the prediction data may cause the enterprise system 200 to passively or actively communicate the prediction data to the corresponding user 110. The prediction data may be data 234 communicated from the storage device 224 of the computing system 206 for receipt by the user device 104, 106 of the user 110 using known data communication methods and protocols as established and described with reference to FIG. 1. The user 110 then accesses the prediction data, which may be presented visually in the form of text as displayed on the screen 140 of the user device 106 or may be audibly played for the user 110 via use of the speaker 144 of the user device 106. The prediction data accordingly forms a form of transferrable output of the machine learning program that can be communicated to the user 110 via a transfer of such prediction data (or a representation thereof) from the computing system 206 of the enterprise system 200 to the user device 104, 106 of the corresponding user 110.

The enterprise system 200 may determine to utilize the prediction data for performing a specific task at step 1005 depending on a variety of different factors, including the use of several triggering conditions in similar fashion to the description of when a determination of the prediction data is to be determined with respect to a user 110 as described hereinabove with respect to step 1004. Such conditions are briefly discussed hereinafter.

In some circumstances, the computing system 206 may determine that the prediction data is to be communicated to a corresponding user 110 when the personal data of the user 110 accessible to the enterprise system 200 indicates that a triggering condition has occurred. Such a communication of the prediction data following the triggering condition may occur using any of the methods described above. The triggering condition may utilize or refer to the personal data of the user 110 that is widely or publicly available, the personal data of the user 110 that is specifically accessible by the enterprise system 200 via the relationship present between the user 110 and the enterprise system 200 (such as the data regarding the account history of the user 110 with the enterprise system 200 or those recorded interactions of the user 110 with the application 330 associated with the enterprise system 200), or the personal data of the user 110 that is acquired by the enterprise system 200 from an approved third party source. The triggering condition may include multiple conditions being met prior to the triggering condition being met, such as any combination of different thresholds of any combination of variables being met in similar fashion to the examples provided above with regards to when the machine learning model creates such prediction data.

In other circumstances, the computing system 206 may determine that the prediction data is to be communicated to the corresponding user 110 when the prediction data itself indicates that a triggering condition has occurred requiring the communication of such prediction data to the user 110. For example, if the prediction data includes the calculation of a holistic score or sub-score regarding an assessment of the user 110, the communication of the prediction data may only occur when one of the calculated scores is above or below a preselected threshold score value. Specifically, the triggering event may include any one of the predicted scores or predicted survey responses indicating a need for the communication of the prediction data to the user 110 based on the specified criteria of the enterprise system 200, or any combination of such conditions.

The computing system 206 may also be configured to record each instance of the determination of the prediction data with respect to each user 110, wherein such past determinations are referred to hereinafter as the historical prediction data regarding the user 110. Such historical prediction data may be utilized in creating a triggering condition for initiating the communication of the current prediction data to the user 110. Such a triggering condition may occur when a threshold change has been determined as occurring between the historical prediction data and the current prediction data. Such a change may refer to an amount of change in the value of any of the calculated scores reaching a threshold value with respect to previous determination of the prediction data, whether such change is positive or negative. Such a change may be determined over the course of the history of such determinations from an initial value or may be evaluated with respect to a certain time frame, such as requiring a certain change in value with respect to a certain period of time, or a certain change with respect to any one of the previous determinations made within a specified time frame. Any of the scores, sub-scores, or predictions regarding individual responses may be utilized in making such a comparison.

With respect to individual responses, a triggering condition may refer to a predicted response corresponding to an impression of the user 110 that is different from a previous iteration of such a predicted response, such as an opposite impression being given with respect to a scale of possible responses of the user 110. For example, a response indicative of strongly agreeing with a query that has been changed to a response indicative of strongly disagreeing with that same query may be indicative of such a triggering condition being met.

In addition to the historical prediction data, the enterprise system 200 may also utilize the survey data regarding at least some of the users 110 as utilized in training the machine learning program to determine when to perform such a task. Such survey data may act as a basis for comparison to newly determined prediction data in the same manner as described above where such a comparison is available and possible with respect to the corresponding user 110. Specifically, any responses given by the corresponding user 110 to the survey forming the basis of the predictive model, and any resulting scores determined on the basis of any methodology, may also be utilized as benchmark data against which the newly determined prediction data is to be compared, including determining if a threshold change has occurred with respect to any aspect of the data.

Additionally, if a feedback mechanism is utilized for confirming the prediction data against the current impressions of the user 110 according to the described semi-supervised training process of step 1007, the feedback data regarding the responses of the user 110 to the queries of the survey may also be utilized as a basis for comparison to the newly determined prediction data. That is, any feedback given by the user 110 regarding a difference in impression of any query of the survey may be utilized for comparison to any subsequently determined prediction data regarding that user 110, such as a change in the impression of the user 110 regarding any specific survey query.

In some embodiments, the aforementioned reporting of the prediction data may further include the reporting of the historical prediction data regarding the corresponding user 110 in addition to the instantaneous prediction data based on the instantaneous personal data profile of the corresponding user 110. That is, the previously described reporting of the prediction data via the web browser or software application 132 or via the use of a communication sent to the user device 104, 106 may include the reporting of a plurality of the past iterations of the prediction data forming the historical prediction data, such as a record of each subsequent generation of the prediction data. Such past data, such as past predicted financial health assessment scores based on past personal data profiles of the corresponding user 110, may be displayed in list form or may be displayed graphically in the form of a chart or graph, such as graphically displaying the predicted assessment scores over a period of time or over a number of sequential iterations in the form of a bar graph or line graph, as non-limiting examples.

Each instance of the generation of the prediction data, such as each instance of the generation of the predicted financial health assessment score for the corresponding user 110, may also be displayed in accordance with information relating to the change in the personal data set of the corresponding user 110 leading to the newly predicted data. For example, if the predicted financial health assessment score of the corresponding user 110 changes following a change in the personal data set of the corresponding user 110, such as may be indicated by the purchase of a specific product and/or service or the change of a specific account setting, the nature of the change in the personal data set may be included in the reporting of the predicted financial health assessment score, such as listing the purchase in question or listing the nature of the change in the account setting in a manner relating such an event to the change in the predicted financial health assessment score. Each change in the personal data set relating to such a change in the predicted financial health assessment score may also be associated with a numeric value corresponding to the amount of change in the predicted financial health assessment score associated with the change in the personal data set, wherein such a numeric value corresponds to the difference in value occurring between successive iterations of the generating of the predicted financial health assessment score.

The reporting of the change in the personal data set causing such a change in the predicted financial health assessment score may only occur when a triggering condition is met. For example, the historical prediction data may only include data regarding those changes to the personal data set of the corresponding user 110 causing a change in the predicted financial health assessment score that exceeds a threshold value. The use of such a triggering condition may aid in filtering out minor changes in activity by the user 110 or the enterprise system 200 leading to relatively minor or negligible changes to the predicted financial health assessment score from being reported to the user 110, thereby avoiding a flood of information rendering it difficult to determine which activities are contributing to such changes. The determined change in value related to the threshold value may be taken with respect to any two different instances of the prediction data being generated, and is not necessarily limited to successive iterations. For example, the triggering condition may be based on a change in value occurring over a selected period of time, as opposed to occurring between subsequent iterations of the generating step.

The reporting of such historical prediction data may include the ability of the user 110 to sort such activities by relevance or importance with regards to those changes in the personal data set having the greatest positive or negative impact on the predicted financial health assessment score of the user 110. The user 110 may be able to sort those changes in the personal data set leading to an increase or decrease in the predicted score by the amount of the increase or decrease occurring. The user 110 may be able to sort the historical prediction data according to the type of activity leading to the change in the predicted financial health assessment score, such as the purchases made by the user 110 having a positive or negative impact on such a score, or the online activities of the user 110 when utilizing the web browser or software application 132 having a positive or negative impact on such a score. The sorting may also include the segregation of those activities, services, products, or services offered by or specifically associated with the enterprise system 200 that have had an effect on the predicted financial health assessment score. Such segregation allows the user 110 to determine how the activities of the enterprise system 200 regarding the user 110 have positively or negatively affected the predicted financial health assessment score, which allows the user 110 to more easily access the impact of the enterprise system 200 on the predicted financial health assessment score in comparison to those activities driven by the user 110 or a third party organization independent of the enterprise system 200.

As an example of the above concepts, the user 110 may access the web browser or software application 132 to view the instantaneous predicted financial health assessment score of the user 110 based on the most up to date personal data set of the user 110 as known by the computing system 206. The user 110 may also view the historical prediction data regarding each of the predicted responses and scores regarding the user 110 that have occurred previously. In the present example, the user 110 may view a plurality of past determinations of the predicted financial health assessment score, such as five past iterations of the generation of the score based on five different changes in the personal data set of the user 110. The five different predicted scores may be charted or graphed to better display the trend or trends occurring with respect to such changes in the personal data set. Each prediction of the score may be associated with a time and date, or with a set of conditions associated with the user 110, such as certain entries of the personal data set of the user 110 when the score was predicted. As a specific example, each iteration may include the ability to access the personal data set or a representation of the information included therein, such as specific account balances or account settings, that the user 110 had at the time of each of the predicted scores. Each successive reported score may also include information relating to the change in the personal data set leading to such a change in the score.

With reference to the five different iterations mentioned in the current example, a first iteration may show a score of 80.0 (out of 100.0) with an increase of 2.0 from the previous iteration of 78.0 following the purchase of a first product. A second iteration may show a score of 80.5 with an increase of 0.5 following a change in account settings by the user 110 with respect to a setting stored to the computing system 206. A third iteration may show a score of 79.5 with a decrease of 1.0 following a missed payment on a loan managed by the enterprise system 200. A fourth iteration may show a score of 81.0 with an increase of 1.5 following a large deposit to a savings account of the user 110. A fifth iteration may show a score of 81.0 with a decrease of 1.0 following the user 110 making a decision to purchase an unnecessary product offered by a third party independent of the enterprise system 200. Each of the events causing each change in the score may be displayed in conjunction with the corresponding change in score in a manner wherein the user 110 can easily identify the relationship present therebetween.

According to such exemplary iterations, the user 110 can easily determine the activities that are positively and negatively affecting the resulting predicted financial health assessment score, and can model future activities on the basis of such information. The ability to identify those activities specific to the enterprise system 200, such as those products and/or services offered by the enterprise system 200 and tending to improve the score of the user 110, also aids the user 110 in determining how to evaluate the impact that the enterprise system 200 has had on such a score as opposed to those activities performed by the user 110 independent of the influence of the enterprise system 200. The ability to see the trends based on past activities also allows the user 110 to determine whether the user 110 is on the right track in achieving a specific score or the like.

As mentioned previously, the prediction data may include the generation of at least one sub-score or at least one different score based on the personal data set of the user 110 in question. As one specific example, the predictive model may be configured to make any and all predictions related to the results of a financial health assessment survey having queries that are categorized as relating to the saving, spending, borrowing, or planning habits of the user 110, with each of these categorization being associated with an independent assessment sub-score. In predicting the results of such a survey, the prediction data may accordingly include a holistic predicted financial health assessment score, a predicted saving habits assessment sub-score, a predicted spending habits assessment sub-score, a predicted borrowing habits assessment sub-score, and a predicted planning habits assessment sub-score.

The previously described reporting of the prediction data may accordingly further include the display of any and all data relating to such sub-scores in addition to that relating to the holistic predicted financial health assessment score as described above. For example, any one of the sub-scores may be accessed wherein all historical sub-score data is available to show the change in each sub-score over time and which events corresponding to a change in personal data of the user 110 have occurred to cause such changes to the sub-scores. Each of the different sub-scores may also be able to be sorted by the amount of change occurring, the type of change in data causing the change in score, or the origin of the activity leading to the change in the same manner described above.

The prediction data including the prediction of a holistic financial health assessment score as well as several sub-scores based on categories of activities allows the user 110 utilizing such services to determine how certain events affect the user 110 with respect to various different interconnected aspects of financial health and well-being. Certain events resulting in a change to the personal data set of the user 110 may be found to lead to a prediction of a change in multiple different sub-scores as well as the holistic score, thereby allowing the user 110 to evaluate certain events with respect to multiple different evaluative perspectives. For example, it is conceivable that certain events will improve the assessment of the user 110 with respect to multiple, if not all, of the predicted scores, while other events may cause one score to improve at the detriment of one or more other scores, such as when the resources of the user 110 are reallocated from one product and/or service related to one category of financial well-being to another product and/or service related to another category of financial well-being. The user 110 can accordingly utilize the ability to track such sub-scores to weigh how certain decisions may affect different assessments of the user 110 in accordance with the goals of the individual user 110. For example, the user 110 can prioritize those activities that are shown to improve a particularly weak sub-assessment of the user 110 rather than those shown to have little impact on an already strong assessment of the user 110, or can attempt to perform those actions having a positive impact on the largest number of categories of financial well-being, as the circumstances may warrant.

With regards to step 1005, the enterprise system 200 may also initiate alternative interactions with the user 110 beyond merely communicating the prediction data such as the scores or predictions of responses to certain queries to the user 110 in the forms mentioned above. Such alternative interactions may include the enterprise system 200 offering products and/or services to the user 110 in reaction to an analysis of the prediction data specific to the user 110. Such products and/or services may be provided in an attempt to intervene and improve an assessment of the user 110 as determined by the prediction data. Such products and/or services may be freely provided or may be offers for sale of said products and/or services by the enterprise system 200. In other circumstances, the enterprise system 200 may discontinue, or offer to discontinue with the permission or approval of the user 110, the availability of certain products and/or services to the user 110 in order to intervene and improve an assessment of the user 110 as determined by the prediction data.

The determination to initiate the described alternative interactions may occur in the same manner as that described with regards the determinations to communicate the prediction data to the corresponding user 110 as described above. Specifically, the interactions described hereinafter may be initiated by any of the triggering conditions or combinations thereof described hereinabove as initiating such a communication of the prediction data, or in initiating the generation of the prediction data via use of the predictive model. Such triggering conditions may be specifically related to the products and/or services offered as a part of the given interaction as illustrated by the representative examples provided below in describing such interactions.

The described offer of products and/or services from the enterprise system 200 may take many different forms. In some circumstances, the offer may constitute an offer of educational materials regarding a topic indicated as being of concern in relation to the prediction data associated with a corresponding user 110. As one example, the prediction data regarding a user 110 may indicate that the user 110 has a low level of confidence regarding the ability of the user 110 to retire with adequate long term investments, as based on predicted responses to survey queries or a predicted score relating to such an assessment, and this may prompt the enterprise system 200 to interact with the user 110 in an attempt to address this predicted concern. Such an interaction may, in the case of educational materials, include a communication from the computing system 206 of the enterprise system 200 to the user device 104, 106 of the user 110, such as by an email, text message, or push notification, as non-limiting examples. Such educational materials may additionally or alternatively be made available for access via the account of the corresponding user 110 when accessing the web browser application or software application 132 corresponding to the enterprise system 200. In the present example, the educational materials may include guidance on products and/or services available for purchase from the enterprise system 200, or other actions the user 110 can take to improve the assessment of the user 110.

In other circumstances, the communication from the computing system 206 to the user device 106 may include a direct offer for the product and/or service to be purchased by the user 110 or otherwise provided by the enterprise system 200 to the user 110 by express agreement. Continuing the example of a user 110 having low confidence with respect to retirement, the communication to the user 110 may include an offer to purchase an investment related product or service from the enterprise system 200, or may include an offer for the enterprise system 200 to offer periodic advise to the user 110 regarding topics such as long-term planning as provided by an agent 210. Such an offer may include the communication from the computing system 206 to the user device 104, 106 including information for redirecting the user device 104, 106, such as may occur via use of the appropriate web browser application or software application 132, to an appropriate interface for completing the purchase of the product and/or service, as may be accessible via the application 132.

In some circumstances, the offer of the products and/or services to the user 110 may also include a reference to the personal data of the corresponding user 110 for prepopulating data related to the purchase of the product and/or service. For example, if the process of completing the purchase of the product and/or service includes the user 110 entering information into an interface provided by the webpage or application 132, the personal data of the user 110 as known by the computing system 206 may be utilized to automatically prepopulate any fields of the purchase process to which the personal data corresponds. As another example, the purchase of some products and/or services may require documents to be populated with such personal data, hence the enterprise system 200 may be configured to automatically prepopulate such documents prior to communicating such documents to the user 110. Such documents may comprise transferable files of any desired type compatible with each of the associated devices or computing systems 104, 106, 206.

The computing system 206 may accordingly utilize the prediction data, as determined by the machine learning algorithm, in providing an output in the form of a communication relating to a product and/or service that may be beneficial to the user 110, which may constitute an offer for purchase of the product and/or service. Such a communication may further include output in the form of a prepopulated document/file or a prepopulated payment interface relating to the corresponding purchase/agreement in an attempt to provide said product and/or services to the user 110. Such a prepopulated document or interface may be accessible via use of the user device 104, 106 following a transfer of the file/data to the user device 104, 106 from the computing system 206.

The computing system 206 may alternatively alter the account settings of the user 110 in a manner altering a manner in which the computing system 206 interacts with the user 110 via the corresponding user device 104, 106 in response to the generation of the prediction data regarding the user 110. For example, such account setting changes may include changing the settings relating to the frequency of communications sent from the computing system 206 to the user 110 for access via the user device 104, 106, under what conditions to communicate with the user 110, the content of such communications, the types or forms of such communications, the manner in which the interface of the web browser application or software application 132 displays information to the user 110, or the information or resources accessible to the user 110 via navigation of the web browser application or software application 132, as non-limiting examples. The changing of the account settings may refer to the computing system 206 altering the account related data stored as a form of the data 234 associated with the storage device 224, which in turn results in a reconfiguring of the operation of the computing system 206 with regards to how the computing system 206 subsequently interacts with the user device 104, 106 with respect to at least one variable.

The predictive model of the machine learning program as described herein also provides the ability for the computing system 206 of the enterprise system 200 to perform various evaluative processes for determining how best to interact with the user 110 for improving the assessment of the user 110. That is, the predictive model may be utilized to determine which actions should be taken by the computing system 206 in order to positively alter the prediction data regarding the specific user 110, such as reversing a negative impression of the user 110 regarding a query from the survey or improving an assessment score or sub-score in a manner indicating an improved condition of the user 110.

Referring now to FIG. 8, a method 1010 of determining which task or tasks should be taken by the computing system 206 following the generation of the prediction data with respect to a specific user 110 is disclosed. The method is shown as beginning with the same step 1004 as disclosed in FIG. 7 wherein the prediction data is generated with respect to a specific user 110. Once the prediction data is generated, the method may include a step **1004*a* of generating a test personal data set with respect to the specific user 110. The test personal data set refers to a data set including the personal data of the user 110 as utilized in predicting the prediction data of step 1004, but with one or more entries of the personal data changed in a manner reflecting a change in behavior by at least one of the user 110 or the enterprise system 200. Such a change in behavior may refer to a change in behavior of the computing system 206, and in turn a change in behavior of the corresponding software application 132**, depending on the circumstances.

For example, the personal data set of a specific user 110 may include a data entry indicating that the specific user 110 does not currently have car insurance, and this condition of the user 110 is reflected in the prediction data generated with respect to the specific user 110. A test personal data set of that specific user 110 may include the computing system 206 substituting a different value or condition for at least one variable corresponding to an entry of the personal data set of the specific user 110, such as altering the above example entry to reflect that the specific user 110 now has adequate car insurance. The test personal data set may also include a change to multiple different entries of the personal data set to determine if multiple different actions should be taken in response to the generation of the prediction data in step 1004. Generally, each change of one of the data entries when forming the test personal data set corresponds to a potential change in a relationship between the corresponding user 110 and the enterprise system 200.

The computing system 206 may be preprogrammed to generate the test personal data set and determine which variables to change from the personal data set based on the known actions that the enterprise system 200 and/or the computing system 206 are capable of taking in altering such data entries. For example, the test personal data set would not include changes to certain immutable traits of the specific user 110, but would instead include changes to data entries corresponding to changes in the future interactions between the specific user 110 and the computing system 206 and/or enterprise system 200 that are predicted to correspond to an improvement in the condition of the specific user 110. Such data entries may relate to the products and/or services that the specific user 110 is or is not utilizing that originate from the enterprise system 200, to certain behaviors of the enterprise system 200 relating to the tasks that the computing system 206 and/or enterprise system 200 currently are or are not performing with respect to the specific user 110, or to certain behaviors of the specific user 110 that could be modified as revealed within the personal data set, whether relating to the enterprise system 200 or the user 110.

With respect to data entries regarding products and/or services, the personal data set of the specific user 110 may include a change such as that described in the above example wherein one or more data entries regarding the utilization of certain products and/or services is changed in a manner corresponding to a potential purchase by the specific user 110 of a previously deficient product and/or service or the agreement for such a product and/or service to be offered to the user 110 by the enterprise system 200. In some circumstances, it may be determined that a certain product and/or service being utilized by the specific user 110 and originating from the enterprise system 200 is found to have a negative impact on the assessment of the specific user 110, hence changes reflecting the discontinuation or sale of a product and/or service may also be utilized in generating the test personal data set.

With respect to the behaviors of the enterprise system 200, the test personal data set of the specific user 110 may include a change to one or more data entries of the personal data set indicating a change in a manner the computing system 206 and/or the enterprise system 200 is currently interacting with the specific user 110. For example, a data entry may be changed indicating whether the specific user 110 is currently enrolled or nor enrolled to receive certain communications from the computing system 206 via email, text message, push notification, or the like.

With respect to the behaviors of the specific user 110, the test personal data set of the specific user 110 may include a change to one or more data entries of the personal data set indicating a condition of the specific user 110 that could be changed via an appropriate intervention of the computing system 206 and/or enterprise system 200. For example, the personal data set of the specific user 110 may include an entry indicating that the specific user 110 has or has not received or otherwise engaged with educational materials provided by the computing system 206 and available at the request of the user 110.

Next, in a step **1004*b* the predictive model may be utilized to generate a test prediction data set with respect to the test personal data set of the specific user 110. The test prediction data set may include the same types of prediction data as that generated in step 1004**, including the predictions regarding responses, assessment scores, and assessment sub-scores.

A step **1004*c* includes the computing system 206 comparing the prediction data regarding the actual personal data set of the specific user 110, as generated in step 1004, to the test prediction data of the specific user 110, as generated in step 1004*b*, in order to determine whether the changes to the personal data set in step 1004*a* have positively or negatively affected the assessment of the specific user 110. The comparing step 1004*c* may include any of the described assessment scores or sub-scores being compared between the prediction data set and the test prediction data set to determine if an increase or decrease was caused by the change in the personal data entry, or whether the predicted response to a query has changed following the change in the personal data entry. Those changes resulting in an increase in such an assessment score may be considered to be representative of changes that may take place with respect to the activities of the user 110 and/or the enterprise system 200 that are beneficial and should be recommended/adopted, whereas those changes resulting in a decrease in such as assessment score may be considered to be representative of changes that may take place with respect to the activities of the user 110 and/or the enterprise system 200** that are potentially harmful and should be avoided/discontinued.

The steps 1004*a*, 1004*b*, 1004*c* may be performed with respect to as many distinct test personal data sets as is necessary or desired. A step 1004*d* includes the computing system 206 determining which tasks should be performed by the computing system 206 and/or enterprise system 200 based on the results of the comparing step 1004*c*, wherein such tasks are once again represented as occurring at a step 1005. Each task is selected to correspond to the change in the data described above with respect to the generation of the test personal data set, or a request or suggestion that an action be taken leading to the change in such data.

With reference to the previous examples, a change in a data entry relating to a product or service offered by the enterprise system 200 may result in the determination of a task wherein the computing system 206 sends a communication to the specific user 110 regarding the purchase of the product or service for which the personal data of the specific user 110 indicates that the specific user 110 is deficient. On the contrary, if the current use of a product or service offered by the enterprise system 200 is shown to negatively affect the assessment of the specific user 110 in comparison to the absence of such a product or service, the computing system 206 may discontinue (or offer to discontinue) providing the product or service in question. A change in a data entry relating to the activities of the computing system 206 and/or enterprise system 200 may result in a task wherein the computing system 206 alters the account settings of the specific user 110 to change the number or types of communications send from the computing system 206 to the user 110, including increasing or decreasing such frequency depending on the comparison between such circumstances. A change in a data entry relating to the activities of the specific user 110 may result in a task wherein the computing system 206 attempts to intervene by suggesting certain changes in behavior of the specific user 110, as may occur by sending a communication to the specific user 110 regarding suggestions for altering the personal data profile of the specific user 110 in accordance with the examples and concepts described herein.

In some embodiments, each task that is shown to be indicative of an improvement in the desired assessment of the specific user 110 may be selected to be taken, including multiple different actions being taken with respect to multiple different data entries discovered to be capable of being addressed via an intervention by the computing system 206, the enterprise system 200, or the specific user 110 himself. In other embodiments, the computing system 206 may rank the tasks to be taken with respect to which tasks have been identified by an iteration of the generation of the test prediction data to result in the greatest improvement to the assessment of the specific user 110 (based on a change in a corresponding data entry considered to be related to or corresponding to the task being considered), including ranking the change to the value of the assessment score or sub-score of the specific user 110 between the test prediction data and the actual prediction data generated with respect to the specific user 110, or ranking the resulting assessment scores themselves, wherein the personal data set corresponding to the highest resulting assessment score is utilized in determining which tasks to perform.

Referring now to FIG. 9, another method 1200 of determining which task or tasks should be taken by the computing system 206 following the generation of the prediction data with respect to a specific user 110 is disclosed. A step 1201 includes the computing system 206 generating a first prediction data set with respect to the specific user 110 according to a first iteration of the predictive model, which results in the formation of historical prediction data set with respect to the specific user 110. Alternatively, the step 1201 may include the computing system 206 acquiring the actual survey data related to the specific user 110 having completed the survey in place of the first iteration of the generation of the prediction data, which may also be considered to be historical data in the context of the present example. In either event, the step 1201 takes place with respect to a first personal data profile of the specific user 110 corresponding to the personal data profile of the specific user 110 at the time of the step 1201.

A step 1202 includes the computing system 206 generating a second prediction data set with respect to the specific user 110 according to a second iteration of the predictive model, which takes place with respect to a second personal data profile of the specific user 110 corresponding to the personal data profile of the specific user 110 at the time of step 1202, which is assumed to occur after the time of step 1201 and include a change in at least one entry of the personal data set of the user 110 during the time that has elapsed between steps 1201 and 1202.

A step 1203 includes comparing the first prediction data set (or the actual survey data) to the second prediction data set to determine if the assessment of the specific user 110 has changed with respect to any response, score, or sub-score, as necessary for the desired evaluation in question. A step 1204 includes then comparing the first personal data profile to the second personal data profile to determine which data entries have changed within the personal data sets between the occurrence of steps 1201 and 1202, or whether a specific data entry has changed, and to what extent such values have changed, if applicable. Such changes may be representative of certain activities engaged in by the specific user 110 via the user device 104, 106 or the computing system 206 between the occurrence of steps 1201 and 1202 that may be addressed by an appropriate intervention by the computing system 206 in the same manner as described herein. For example, a loss of valid car insurance by the specific user 110 during such an interval may be represented as a difference between the first and second personal data sets that is identified during step 1204. In some embodiments, the amount of the change in the data entry being evaluated may act as a form of triggering condition for determining whether to proceed from step 1203 depending on whether the amount of change exceeds a threshold value.

If the comparison occurring at step 1203 indicates an improvement of the assessment of the specific user 110 between the steps 1201 and 1202, then the change or changes discovered between the first and second personal data sets during the step 1204 may be correlated with the improvement to the assessment. On the contrary, if the comparison at step 1203 indicates a reduction in the assessment of the specific user 110 between the steps 1201 and 1202, then the change or changes discovered between the first and second personal data sets during step 1204 may be correlated with the regression in the assessment.

A step 1205 accordingly includes the computing system 206 correlating the determined change in the personal data set occurring between steps 1201 and 1202 to the determined change in the prediction data occurring between steps 1201 and 1202 to determine whether the change reflected within the data is representative of having a positive or negative influence on the assessment of the user 110.

In some circumstances, it may be discovered that multiple different data entries of relevance have changed between the occurrence of the steps 1201 and 1202. In such circumstances, the method according to FIG. 8 may be utilized to test possible changes to each of these data entries in order to determine which, if any, of the changing data entries is most responsible for the change in the assessment of the user 110 as reflected in the prediction data generated at steps 1202. Such a test may result in a ranking of the possible changes with respect to the predicted difference in the resulting assessment.

The process occurring with respect to steps 1203, 1204, and 1205 may be utilized as an evaluative tool of the computing system 206 for collecting data regarding the changes in the behavior of the user 110 and/or the computing system 206 that result in a change in the resulting prediction data. Such steps 1203, 1204, 1205 may also be utilized to determine which action to be taken by the computing system 206 with respect to the step 1005 shown in FIGS. 7 and 8, which may occur following the step 1205. Those changes in data entries correlated to the regression in the assessment of the user 110 may be addressed by any of the interventions described herein regarding actions taken by the computing system 206 with respect to the user 110 and the corresponding user device 104, 106 in attempting to address the behavior or activity reflected in the change in data. In similar fashion, those changes corresponding to an improved assessment may be emphasized or maintained by the future actions of the computing system 206.

In one specific implementation, the method 1200 according to FIG. 9 may be utilized to automatically reconfigure the computing system 206 via a change in the account settings regarding the user 110 with respect to the action taken by the computing system 206 at step 1005. The method 1200 may be initiated at the request of the user 110 via the web browser application or software application 132 or may be initiated by an agent 210 using an appropriate agent device 212. The use of method 1200 may be presented as an opportunity to evaluate the user 110 between any two iterations of the different data sets described above to determine which actions should be taken by the computing system 206 to address the concerns raised by the evaluation process.

For example, the user 110 may request an evaluation be performed with respect to two different dates corresponding to steps 1201 and 1202. The steps 1203, 1204, and 1205 may then be utilized to identify the changes in data and corresponding behaviors that are correlated to be causing a change in assessment. The computing system 206 may then initiate those changes that can be automatically performed (and without requiring the explicit consent of the user 110) with respect to any of the possible actions described as occurring at step 1005, including changing the account settings of the user 110. The user 110 may otherwise be automatically prompted on whether each suggested change in behavior be adopted, as desired. Specifically, any of the communications described herein may include content relating to a request of the corresponding user 110 to approve of such a change in an account setting, rather than automatically and proactively making such a change. Similarly, any of the communications described herein may include content relating to a request of the corresponding user 110 for approval to discontinue use of a specific product and/or service offered by the enterprise system 200, rather than automatically and proactively making such a change.

The methods according to the present invention provides numerous advantages to the user 110 of the enterprise system 200. First, the user 110 is able to have an up to date assessment of the user 110 without having to complete another survey or set of survey queries, which allows for the assessment of the user 110 to be made more regularly. This increase in the occurrence of the assessment of the user 110 in turn increases the likelihood of a timely intervention for addressing the concerns of the user 110. Second, the completion of such surveys can be timely and cumbersome, and hence such activities can be avoided by the user 110. Third, the user 110 can be addressed in a manner by the enterprise system 200 corresponding to a predicted maximum improvement in the assessment of the user 110, which should correspond to a maximized improvement of the financial health and well being of the user 110 when the survey is provided in this context.

The enterprise system 200 similarly benefits from the disclosed methods as a result of the reduction in the need for additional customer or client engagement by bypassing the need to request multiple surveys from each user 110, or any surveys at all, depending on the circumstances. The disclosed method also ensures that the most appropriate or useful actions be taken by the enterprise system 200 such that the impression of the enterprise system 200 is improved with respect to the user 110. The improved financial condition of the user 110 may also facilitate an improvement in the relationship between the enterprise system 200 and the user 110 via the purchase of additional products and/or services or the improved capability of the user 110 to meet obligations to the enterprise system 200, as the circumstances may warrant.

The use of the machine learning program and resulting predictive model also improves the efficiency of the operation of the computing system 206 in various different respects. First, the disclosed method provides an ability for the computing system 206 to eliminate unnecessary calculations and communications relating to certain tasks performed by the computing system 206 that have been found to not have a positive improvement on the corresponding assessment or impression of the user 110. For example, the disclosed method provides a means for the computing system 206 to determine whether certain customer or client engagement tasks are being utilized by the user 110 and to what effect, and may then eliminate or offer eliminate performing those tasks in accordance with the predictions made by the predictive model. The computing system 206 may be configured to automatically introduce these changes in the way the computing system 206 interacts with the user 110 and the corresponding user devices 104, 106 via the review of such prediction data, or to automatically request permission to request such changes. This results in the computing system 206 avoiding a waste of resources when performing certain tasks, such as sending unnecessary communications of various forms to users 110 that will never interact with or benefit from the sending of such communications.

The use of the machine learning program also allows for certain variables in the personal data sets utilized in the training process to be determined to be irrelevant to certain relationships. The identification of these variables that do not predict any specific result may be omitted from further analysis or may no longer be monitored by the computing system 206 in forming the personal data sets. The predictive model accordingly provides a means to identify those data that are not necessary to be tracked or collected and further allows for the calculations occurring via the computing system 206 to be simplified by means of the elimination of additional variables.

Particular embodiments and features have been described with reference to the drawings. It is to be understood that these descriptions are not limited to any single embodiment or any particular set of features. Similar embodiments and features may arise or modifications and additions may be made without departing from the scope of these descriptions and the spirit of the appended claims.

From the foregoing description, one ordinarily skilled in the art can easily ascertain the essential characteristics of this invention and, without departing from the spirit and scope thereof, can make various changes and modifications to the invention to adapt it to various usages and conditions.

We claim:

1. A computing system, comprising:

a memory device; and a processing device operatively coupled to the memory device, wherein the processing device is configured to execute computer-readable program code to:

iteratively train, using training data comprising a personal data set of a plurality of first users, a predictive model incorporating a machine learning program, the predictive model including a neural network that performs cluster analysis via unsupervised learning, the personal data set including a data entry regarding an assessment score determined with respect to each respective first user, the predictive model being trained to predict a financial health assessment score for each respective first user, wherein the financial health assessment score is determined based on input responses received from each respective first user to a financial health assessment survey, wherein the training of the predictive model includes:

ingesting electronically received responses to the financial health assessment survey to be included as part of the training data:

performing automated data validation on the responses to verify that distributional statistics of the responses fall within expected bounds;

inserting the training data that includes the responses into an iterative training and testing loop to predict a target variable; and repeatedly predicting the target variable during each iteration of the training and testing loop, wherein each iteration of the training and testing loop has differing weights applied to one or more nodes of the machine learning program, each of the differing weights being updated with each iteration of the training and testing loop to reduce error in predicting the target variable and automatically pausing the iterative training and testing loop upon detection of any anomaly until corrective action is taken, which improves predictability of the target variable and functionality of the predictive model;

deploy the trained predictive model;

predict, using the trained predictive model, a predicted assessment score of a second user associated with a user device, the predicting of the predicted assessment score including the trained predictive model correlating a personal data set of the second user to the personal data set of at least one of the first users, wherein the predicted assessment score includes a numeric assessment score associated with the financial health of the second user;

generate a test personal data set with respect to the second user, the test personal data set including a first data entry changed from the personal data set of the second user, the change of the first data entry corresponding to a change in a relationship between the second user and a first entity;

predict, by the trained predictive model, a test predicted assessment score of the second user, the predicting of the test predicted assessment score including the trained predictive model correlating the test personal data set of the second user to the personal data set of at least one of the first users;

when a difference between the predicted assessment score and the test predicted assessment score meets or exceeds a threshold value, write, to the memory device, account-related data that updates an account setting of the second user and thereby reconfigures operation of the computing system with respect to subsequent communications to the user device;

send a communication to the user device of the second user including content relating to the change in the relationship between the second user and the first entity; and upon generating the predicted assessment score and the test predicted assessment score, trigger a change in the computing system to reflect the contents of the predicted assessment score and the test predicted assessment score.

2. The computing system of claim 1, wherein the change in the relationship between the second user and the first entity corresponds to the second user purchasing a product and/or service from the first entity.

3. The computing system of claim 1, wherein the change in the relationship between the second user and the first entity corresponds to a change in an account setting of the second user.

4. The computing system of claim 3, wherein the change in the account setting of the second user includes a change in at least one of a form, a frequency, or a content of future communications sent from the computing system to the user device.

5. The computing system of claim 3, wherein the change in the account setting of the second user includes a change in a manner in which the second user interacts with the computing system when navigating a software application executed on the user device.

6. The computing system of claim 1, wherein the communication includes an offer for sale of a product and/or service offered by the first entity.

7. The computing system of claim 1, wherein the communication includes a request for approval to change an account setting of the second user.

8. The computing system of claim 7, wherein the change in the account setting of the second user includes a change in at least one of a form, a frequency, or a content of future communications sent from the computing system to the user device.

9. The computing system of claim 7, wherein the change in the account setting of the second user includes a change in a manner in which the second user interacts with the computing system when navigating a software application executed on the user device.

10. The computing system of claim 1, wherein the communication includes a request for approval for the first entity to discontinue providing a product and/or service to the second user.

11. The computing system of claim 1, wherein the personal data set of the second user includes demographic data.

12. The computing system of claim 11, wherein the personal data set of the second user further includes behavioral data regarding at least one of the past activities of the second user and/or the past activities of the computing system taken with respect to the second user.

13. The computing system of claim 11, wherein the personal data set of the second user includes data regarding past interactions between the computing system and the second user via the user device.

14. The computing system of claim 11, wherein the personal data set of the second user includes data regarding a product and/or service provided by an entity associated with the computing system.

15. A computing system, comprising:

a memory device; and a processing device operatively coupled to the memory device, wherein the processing device is configured to execute computer-readable program code to:

iteratively train, using training data comprising a personal data set of a plurality of first users, a predictive model incorporating a machine learning program, the predictive model including a neural network that performs cluster analysis via unsupervised learning, the personal data set including a data entry regarding an assessment score determined with respect to each respective first user, the predictive model being trained to predict a financial health assessment score for each respective first user, wherein the financial health assessment score is determined based on input responses received from each respective first user to a financial health assessment survey, wherein the training of the predictive model includes:

ingesting electronically received responses to the financial health assessment survey to be included as part of the training data;

performing automated data validation on the responses to verify that distributional statistics of the responses fall within expected bounds:

inserting the training data that includes the responses into an iterative training and testing loop to predict a target variable; and repeatedly predicting the target variable during each iteration of the training and testing loop, wherein each iteration of the training and testing loop has differing weights applied to one or more nodes of the machine learning program, each of the differing weights being updated with each iteration of the training and testing loop to reduce error in predicting the target variable and automatically pausing the iterative training and testing loop upon detection of any anomaly until corrective action is taken, which improves predictability of the target variable and functionality of the predictive model;

deploy the trained predictive model;

predict, using the trained predictive model, a predicted assessment score of a second user associated with a user device, the predicting of the predicted assessment score including the trained predictive model correlating a personal data set of the second user to the personal data set of at least one of the first users, wherein the predicted assessment score includes a numeric assessment score associated with the financial health of the second user;

generate a test personal data set with respect to the second user, the test personal data set including a first data entry changed from the personal data set of the second user, the change of the first data entry corresponding to a change in a relationship between the second user and a first entity;

predict, by the trained predictive model, a test predicted assessment score of the second user, the predicting of the test predicted assessment score including the trained predictive model correlating the test personal data set of the second user to the personal data set of at least one of the first users; and change an account setting of the second user stored to the memory device when a difference between the predicted assessment score and the test predicted assessment score meets or exceeds a threshold value, the changing of the account setting reconfiguring operation of the computing system with respect to subsequent communications to the user device.

16. The computing system of claim 15, wherein the change in the account setting of the second user includes a change in at least one of a form, a frequency, or a content of future communications sent from the computing system to the user device.

17. The computing system of claim 15, wherein the change in the account setting of the second user includes a change in a manner in which the second user interacts with the computing system when navigating a software application executed on the user device.

18. A computer-implemented method, comprising:

iteratively training, using training data comprising a personal data set of a plurality of first users, a predictive model incorporating a machine learning program, the predictive model including a neural network that performs cluster analysis via unsupervised learning, the personal data set including a data entry regarding an assessment score determined with respect to each respective first user, the predictive model being trained to predict a financial health assessment score for each respective first user, wherein the financial health assessment score is determined based on input responses received from each respective first user to a financial health assessment survey, wherein the training of the predictive model includes:

ingesting electronically received responses to the financial health assessment survey to be included as part of the training data;

performing automated data validation on the responses to verify that distributional statistics of the responses fall within expected bounds;

inserting the training data that includes the responses into an iterative training and testing loop to predict a target variable; and repeatedly predicting the target variable during each iteration of the training and testing loop, wherein each iteration of the training and testing loop has differing weights applied to one or more nodes of the machine learning program, each of the differing weights being updated with each iteration of the training and testing loop to reduce error in predicting the target variable and automatically pausing the iterative training and testing loop upon detection of any anomaly until corrective action is taken, which improves predictability of the target variable and functionality of the predictive model;

deploying the trained predictive model;

predicting, using the trained predictive model, a predicted assessment score of a second user associated with a user device, the predicting of the predicted assessment score including the trained predictive model correlating a personal data set of the second user to the personal data set of at least one of the first users, wherein the predicted assessment score includes a numeric assessment score associated with the financial health of the second user;

generating a test personal data set with respect to the second user, the test personal data set including a first data entry changed from the personal data set of the second user, the change of the first data entry corresponding to a change in a relationship between the second user and a first entity;

predicting, by the trained predictive model, a test predicted assessment score of the second user, the predicting of the test predicted assessment score including the trained predictive model correlating the test personal data set of the second user to the personal data set of at least one of the first users;

when a difference between the predicted assessment score and the test predicted assessment score meets or exceeds a threshold value, writing, to the memory device, account-related data that updates an account setting of the second user and thereby reconfigures operation of the computing system with respect to subsequent communications to the user device;

sending a communication to the user device of the second user including content relating to the change in the relationship between the second user and the first entity; and upon generating the predicted assessment score and the test predicted assessment score, triggering a change in the computing system to reflect the contents of the predicted assessment score and the test predicted assessment score.

19. The computer-implemented method of claim 18, wherein the change in the relationship between the second user and the first entity corresponds to the second user purchasing a product and/or service from the first entity.

20. The computer-implemented method of claim 18, wherein the change in the relationship between the second user and the first entity corresponds to a change in an account setting of the second user.

* * * * *